(12) United States Patent
Goodson et al.

(10) Patent No.: US 11,571,686 B2
(45) Date of Patent: Feb. 7, 2023

(54) REMOVAL OF HOMOGENEOUS CATALYSTS FROM NMR/MRI AGENTS HYPERPOLARIZED VIA SABRE OR PHIP

(71) Applicants: Board of Trustees of Southern Illinois University, Carbondale, IL (US); Vanderbilt University, Nashville, TN (US); The Regents of the University of California, Oakland, CA (US)

(72) Inventors: Boyd M. Goodson, Carbondale, IL (US); Eduard Y. Chekmenev, Troy, MI (US); Igor V. Koptyug, Siberia (RU); Kirill V. Kovtunov, Siberia (RU); Roman V. Shchepin, Nashville, TN (US); Bryce E. Kidd, Carbondale, IL (US); Jonathan Gesiorski, Hickory Hills, IL (US); Max E. Gemeinhardt, Carbondale, IL (US); Danila A. Barskiy, Berkeley, CA (US)

(73) Assignees: Board of Trustees of Southern Illinois University, Carbondale, IL (US); Vanderbilt University, Nashville, TN (US); The Regents of the University of California, Oakland, CA (US)

( * ) Notice: Subject to any disclaimer, the term of this patent is extended or adjusted under 35 U.S.C. 154(b) by 376 days.

(21) Appl. No.: 16/792,637

(22) Filed: Feb. 17, 2020

(65) Prior Publication Data
US 2021/0252493 A1   Aug. 19, 2021
US 2023/0001400 A9   Jan. 5, 2023

Related U.S. Application Data

(60) Provisional application No. 62/806,482, filed on Feb. 15, 2019.

(51) Int. Cl.
*B01J 31/40*   (2006.01)
*B01J 31/22*   (2006.01)
(Continued)

(52) U.S. Cl.
CPC ....... *B01J 31/4038* (2013.01); *B01J 31/1616* (2013.01); *B01J 31/2273* (2013.01);
(Continued)

(58) Field of Classification Search
CPC ....... B01J 31/40; B01J 31/4015; B01J 31/403
See application file for complete search history.

(56) References Cited

U.S. PATENT DOCUMENTS 8,154,284 B2   4/2012   Duckett et al.
8,766,631 B2   7/2014   Hofmann et al.
(Continued)

FOREIGN PATENT DOCUMENTS

EP   2374016 B1   5/2017
WO   2018162895 A2   9/2018
(Continued)

OTHER PUBLICATIONS

Adams RW et al., A Theoretical Basis for Spontaneous Polarization Transfer in Non-Hydrogenative Parahydrogen-Induced Polarization, The Journal of Chemical Physics, 2009, article 194505, vol. 131, No. 19.
(Continued)

*Primary Examiner* — Caixia Lu
(74) *Attorney, Agent, or Firm* — Stinson LLP

(57) ABSTRACT

The present disclosure provides a method that embodies a simple and effective route to remove homogeneous catalysts from solutions wherein NMR/MRI signal amplification by reversible exchange (SABRE) or parahydrogen-induced
(Continued)

polarization (PHIP) is performed. A method for recovering a homogeneous SABRE/PHIP catalyst for reuse is also described.

20 Claims, 15 Drawing Sheets

(51) Int. Cl.
  *B01J 31/16* (2006.01)
  *B01J 38/68* (2006.01)
  *B01J 38/02* (2006.01)

(52) U.S. Cl.
  CPC .......... *B01J 31/2295* (2013.01); *B01J 38/02* (2013.01); *B01J 38/68* (2013.01); *B01J 2531/827* (2013.01)

(56) References Cited

U.S. PATENT DOCUMENTS

| | | |
|---|---|---|
| 8,825,132 B2 | 9/2014 | Lohman et al. |
| 8,961,933 B2 | 2/2015 | Reineri et al. |
| 9,707,550 B2 | 7/2017 | Goodson et al. |
| 9,790,245 B2 | 10/2017 | Chekmenev et al. |
| 2016/0169998 A1 | 6/2016 | Warren et al. |
| 2016/0263256 A1 | 9/2016 | Aime et al. |

FOREIGN PATENT DOCUMENTS

| | | |
|---|---|---|
| WO | 2018209334 A1 | 11/2018 |
| WO | 2019008308 A1 | 1/2019 |
| WO | 2019020989 A2 | 1/2019 |

OTHER PUBLICATIONS

Adams RW et al., Reversible Interactions with Para-Hydrogen Enhance NMR Sensitivity by Polarization Transfer, Science, 2009, pp. 1708-1711, vol. 323, No. 5922.
Appleby KM et al., Investigating Pyridazine and Phthalazine Exchange in a Series of Iridium Complexes in Order to Define their Role in the Catalytic Transfer of Magnetisation from Para-Hydrogen, Chemical Science, 2015, pp. 3981-3993, vol. 6, No. 7.
Ardenkjaer-Larsen JH et al., Increase in Signal-to-Noise Ratio of > 10,000 Times in Liquid-State NMR, Proceedings of the National Academy of Sciences of the United States of America, 2003, pp. 10158-10163, vol. 100, No. 18.
Ardenkjaer-Larsen JH et al., Facing and Overcoming Sensitivity Challenges in Biomolecular NMR Spectroscopy, Angewandte Chemie International Edition, 2015, pp. 9162-9185, vol. 54, No. 32.
Ardenkjaer-Larsen JH, On the Present and Future of Dissolution—DNP, Journal of Magnetic Resonance, 2016, pp. 3-12, vol. 264.
Bae J et al., 15N4-1,2,4,5-Tetrazines as Potential Molecular Tags: Integrating Bioorthogonal Chemistry with Hyperpolarization and Unearthing Para-N2, Science Advances, 2018, article eaar2978, vol. 4.
Bales LB et al., Aqueous, Heterogeneous Parahydrogen-Induced 15N Polarization, The Journal of Physical Chemistry C, 2017, pp. 15304-15309, vol. 121, No. 28.
Barskiy DA et al., Over 20% 15N Hyperpolarization in Under One Minute for Metronidazole, an Antibiotic and Hypoxia Probe, Journal of the American Chemical Society, 2016, pp. 8080-8083, vol. 138, No. 26.
Barskiy DA et al., A Simple Analytical Model for Signal Amplification by Reversible Exchange (SABRE) Process, Physical Chemistry Chemical Physics, 2016, pp. 89-93, vol. 18, No. 1.
Barskiy DA et al., NMR Hyperpolarization Techniques of Gases, Chemistry A European Journal, 2017, pp. 725-751, vol. 23, No. 4.
Barskiy DA et al., The Absence of Quadrupolar Nuclei Facilitates Efficient 13C Hyperpolarization via Reversible Exchange with Parahydrogen, ChemPhysChem, 2017, pp. 1493-1498, vol. 18, No. 12.
Barskiy D et al., Rapid Catalyst Capture Enables Metal-Free Parahydrogen-Based Hyperpolarized Contrast Agents, ChemRxiv, 2018, preprint available at https://doi.org/10.26434/chemrxiv.6076175.v1.
Barskiy DA et al., Rapid Catalyst Capture Enables Metal-Free Para-Hydrogen-Based Hyperpolarized Contrast Agents, The Journal of Physical Chemistry Letters, 2018, pp. 2721-2724, vol. 9, No. 11.
Barskiy D et al., SABRE and Rapid Filtration Enable Metal-Free Hyperpolarized Contrast Agents, abstract presented at the 14th International Bologna Conference on Magnetic Resonance in Porous Media, Feb. 18-22, 2018, Gainesville, Florida, available at https://nationalmaglab.org/images/news_events/searchable_docs/scientist/mrpm_full_program.pdf.
Bowers CR and Weitekamp DP, Parahydrogen and Synthesis Allow Dramatically Enhanced Nuclear Alignment, Journal of the American Chemical Society, 1987, pp. 5541-5542, vol. 109, No. 18.
Cavallari E et al., 13C MR Hyperpolarization of Lactate by Using ParaHydrogen and Metabolic Transformation in Vitro, Chemistry A European Journal, 2017, pp. 1200-1204, vol. 23, No. 5.
Cavallari E et al., Studies to Enhance the Hyperpolarization Level in PHIP-SAH-Produced C13-Pyruvate, Journal ol Magnetic Resonance, 2018, pp. 12-17, vol. 289.
Colell JFP et al., Direct Hyperpolarization of Nitrogen-15 in Aqueous Media with Parahydrogen in Reversible Exchange, Journal of the American Chemical Society, 2017, pp. 7761-7767, vol. 139, No. 23.
Colell JF et al., Generalizing, Extending, and Maximizing Nitrogen-15 Hyperpolarization Induced by Parahydrogen in Reversible Exchange, The Journal of Physical Chemistry C, 2017, pp. 6626-6634, vol. 121, No. 12.
Comment A, Dissolution DNP for In Vivo Preclinical Studies, Journal of Magnetic Resonance, 2016, pp. 39-48, vol. 264.
Cowley MJ et al., Iridium N-Heterocyclic Carbene Complexes as Efficient Catalysts for Magnetization Transfer from Para-Hydrogen, Journal of the American Chemical Society, 2011, pp. 6134-6137, vol. 133, No. 16.
Crudden CM et al., Mercaptopropyl-Modified Mesoporous Silica: A Remarkable Support for the Preparation of a Reusable, Heterogeneous Palladium Catalyst for Coupling Reactions, Journal of the American Chemical Society, 2005, pp. 10045-10050, vol. 127, No. 28.
Duckett SB and Mewis RE, Application of Parahydrogen Induced Polarization Techniques in NMR Spectroscopy and Imaging, Accounts of Chemical Research, 2012, pp. 1247-1257, vol. 45, No. 8.
Egorova KS and Ananikov VP, Toxicity of Metal Compounds: Knowledge and Myths, Organometallics, 2017, pp. 4071-4090, vol. 36, No. 21.
Erickson SH et al., Metronidazole in Breast Milk, Obstetrics and Gynecology, 1981, pp. 48-50, vol. 57, No. 1.
Ernst RR, Nuclear Magnetic Resonance Fourier Transform Spectroscopy (Nobel Lecture), Angewandte Chemie International Edition, 1992, pp. 805-823, vol. 31, No. 7.
Feng B et al., A Pulsed Injection Parahydrogen Generator and Techniques for Quantifying Enrichment, Journal of Magnetic Resonance, 2012, pp. 258-262, vol. 214, No. 1.
Fleming IN et al., Imaging Tumour Hypoxia With Positron Emission Tomography, British Journal of Cancer, 2015, pp. 238-250, vol. 112.
Gesiorski JL et al., Facile Removal of Homogeneous SABRE Catalysts for Purifying Hyperpolarized Agents, abstract presented at the 59th Experimental Nuclear Magnetic Resonance Conference, Apr. 29-May 4, 2018, Orlando, Florida, available at http://www.enc-conference.org/portals/0/Abstracts2018/ENC20188130.0762VER.1.pdf.
Golman K and Petersson JS, Metabolic Imaging and Other Applications of Hyperpolarized 13C1, Academic Radiology, 2006, pp. 932-942, vol. 13, No. 8.
Goodson BM, Nuclear Magnetic Resonance of Laser-Polarized Noble Gases in Molecules, Materials, and Organisms, Journal of Magnetic Resonance, 2002, pp. 157-216, vol. 155, No. 2.
Goodson BM et al., Hyperpolarization Methods for MRS, eMagRes, 2015, pp. 797-810, vol. 4, No. 4.

(56) References Cited

OTHER PUBLICATIONS

Hovener J-B et al., Parahydrogen-Based Hyperpolarization for Biomedicine, Angewandte Chemie International Edition, 2018, pp. 11140-11162, vol. 57, No. 35.

Iali W et al., Achieving High Levels of NMR-Hyperpolarization in Aqueous Media with Minimal Catalyst Contamination Using SABRE, Chemistry A European Journal, 2017, pp. 10491-10495, vol. 23, No. 44.

Kidd BE et al., Toward Cleavable Metabolic/pH Sensing "Double Agents" Hyperpolarized by NMR Signal Amplification by Reversible Exchange, Chemistry A European Journal, 2018, pp. 10641-10645, vol. 24, No. 42.

Kidd BE et al., Facile Removal of Homogeneous SABRE Catalysts for Purifying Hyperpolarized Metronidazole, a Potential Hypoxia Sensor, The Journal of Physical Chemistry C, 2018, pp. 16848-16852, vol. 122, No. 29.

Kizaka-Kondoh S and Konse-Nagasawa H, Significance of Nitroimidazole Compounds and Hypoxia-Inducible Factor-1 for Imaging Tumor Hypoxia, Cancer Science, 2009, pp. 1366-1373, vol. 100, No. 8.

Komar G et al., 18F-EF5: A New PET Tracer for Imaging Hypoxia in Head and Neck Cancer, Journal of Nuclear Medicine, 2008, pp. 1944-1951, vol. 49, No. 12.

Koptyug IV et al., Para-Hydrogen-Induced Polarization in Heterogeneous Hydrogenation Reactions, Journal of the American Chemical Society, 2007, pp. 5580-5586, vol. 129, No. 17.

Kovtunov KV et al., Observation of Parahydrogen-Induced Polarization in Heterogeneous Hydrogenation on Supported Metal Catalysts, Angewandte Chemie International Edition, 2008, pp. 1492-1495, vol. 47, No. 8.

Kovtunov KV et al., Parahydrogen-Induced Polarization in Heterogeneous Catalytic Processes, Topics in Current Chemistry, 2013, pp. 123-180, vol. 338.

Kovtunov KV et al., Heterogeneous Microtesla SABRE Enhancement of 15N NMR Signals, Angewandte Chemie International Edition, 2017, pp. 10433-10437, vol. 56, No. 35.

Kovtunov KV et al., Hyperpolarized NMR Spectroscopy: d-DNP, PHIP, and SABRE Techniques, Chemistry An Asian Journal, 2018, pp. 1857-1871, vol. 13, No. 15.

Kurhanewicz J et al., Analysis of Cancer Metabolism by Imaging Hyperpolarized Nuclei: Prospects for Translation to Clinical Research, Neoplasia, 2011, pp. 81-97, vol. 13, No. 2.

Lee JH et al., Sensitivity Enhancement in Solution NMR: Emerging Ideas and New Frontiers, Journal of Magnetic Resonance, 2014, pp. 18-31, vol. 241.

Logan AW et al., Hyperpolarization of Nitrogen-15 Schiff Bases by Reversible Exchange Catalysis with Para-Hydrogen, Chemistry A European Journal, 2016, pp. 10777-10781, vol. 22, No. 31.

Manoharan A et al., Achieving Biocompatible SABRE: An in Vitro Cytotoxicity Study, ChemMedChem, 2018, pp. 352-359, vol. 13, No. 4.

Masaki Y et al., The Accumulation Mechanism of the Hypoxia Imaging Probe "FMISO" by Imaging Mass Spectrometry: Possible Involvement of Low-Molecular Metabolites, Scientific Reports, 2015, article No. 16802, vol. 5.

Mewis RE et al., Deactivation of Signal Amplification by Reversible Exchange Catalysis, Progress Towards In Vivo Application, Chemical Communications, 2015, pp. 9857-9859, vol. 51, No. 48.

Natterer J and Bargon J, Parahydrogen Induced Polarization, Progress in Nuclear Magnetic Resonance Spectroscopy, 1997, pp. 293-315, vol. 31, No. 4.

Nikolaou P et al., NMR Hyperpolarization Techniques for Biomedicine, Chemistry A European Journal, 2015, pp. 3156-3166, vol. 21, No. 8.

Procissi D et al., In Vivo 19F Magnetic Resonance Spectroscopy and Chemical Shift Imaging of Tri-Fluoro-Nitroimidazole as a Potential Hypoxia Reporter in Solid Tumors, Clinical Cancer Research, 2007, pp. 3738-3747, vol. 13, No. 12.

Rayner PJ and Duckett SB, Signal Amplification by Reversible Exchange (SABRE): From Discovery to Diagnosis, Angewandte Chemie International Edition, 2018, pp. 6742-6753, vol. 57, No. 23.

Reineri F et al., Use of Labile Precursors for the Generation of Hyperpolarized Molecules from Hydrogenation with Parahydrogen and Aqueous-Phase Extraction, Angewandte Chemie International Edition, 2011, pp. 7350-7353, vol. 50, No. 32.

Reineri F et al., ParaHydrogen Induced Polarization of 13C Carboxylate Resonance in Acetate and Pyruvate, Nature Communications, 2015, article No. 5858, vol. 6.

Shchepin RV et al., Hyperpolarization of "Neat" Liquids by NMR Signal Amplification by Reversible Exchange, The Journal of Physical Chemistry Letters, 2015, pp. 1961-1967, vol. 6, No. 10.

Shchepin RV et al., 15N Hyperpolarization of Imidazole-15N2 for Magnetic Resonance pH Sensing via SABRE-SHEATH, ACS Sensors, 2016, pp. 640-644, vol. 1, No. 6.

Shchepin RV et al., Efficient Synthesis of Molecular Precursors for Para-Hydrogen-Induced Polarization of Ethyl Acetate-1-13C and Beyond, Angewandte Chemie International Edition, 2016, pp. 6071-6074, vol. 55, No. 20.

Shchepin RV et al., Toward Hyperpolarized 19F Molecular Imaging via Reversible Exchange with Parahydrogen, ChemPhysChem, 2017, pp. 1961-1965, vol. 18, No. 15.

Shchepin RV et al., Spin Relays Enable Efficient Long-Range Heteronuclear Signal Amplification by Reversible Exchange, The Journal of Physical Chemistry C, 2017, pp. 28425-48434, vol. 121, No. 51.

Shchepin RV et al., Spin-Lattice Relaxation of Hyperpolarized Metronidazole in Signal Amplification by Reversible Exchange in Micro-Tesla Fields, The Journal of Physical Chemistry C, 2018, pp. 4984-4996, vol. 122, No. 9.

Shi F et al., Heterogeneous Solution NMR Signal Amplification by Reversible Exchange, Angewandte Chemie International Edition, 2014, pp. 7495-7498, vol. 53, No. 29.

Shi F et al., Nanoscale Catalysts for NMR Signal Enhancement by Reversible Exchange, The Journal of Physical Chemistry C, 2015, pp. 7525-7533, vol. 119, No. 13.

Shi F et al., Aqueous NMR Signal Enhancement by Reversible Exchange in a Single Step Using Water-Soluble Catalysts, The Journal of Physical Chemistry C, 2016, pp. 12149-12156, vol. 120, No. 22.

Theis T et al., Microtesla SABRE Enables 10% Nitrogen-15 Nuclear Spin Polarization, Journal of the American Chemical Society, 2015, pp. 1404-1407, vol. 137, No. 4.

Theis T et al., Direct and Cost-Efficient Hyperpolarization of Long-Lived Nuclear Spin States on Universal 15N2-Diazirine Molecular Tags, Science Advances, 2016, page e1501438, vol. 2, No. 3.

Truong ML et al., Irreversible Catalyst Activation Enables Hyperpolarization and Water Solubility for NMR Signal Amplification by Reversible Exchange, The Journal of Physical Chemistry B, 2014, pp. 13882-13889, vol. 118, No. 48.

Truong ML et al., 15N Hyperpolarization by Reversible Exchange Using SABRE-SHEATH, The Journal of Physical Chemistry C, 2015, pp. 8786-8797, vol. 119, No. 16.

Upcroft P. and Upcroft JA, Drug Targets and Mechanisms of Resistance in the Anaerobic Protozoa, Clinical Microbiology Reviews, 2001, pp. 150-164, vol. 14, No. 1.

Vazquez-Serrano LD et al., The Search for New Hydrogenation Catalyst Motifs Based on N-Heterocyclic Carbene Ligands, Inorganica Chimica Acta, 2006, pp. 2786-2797, vol. 359, No. 9.

Walker TG and Happer W, Spin-Exchange Optical Pumping of Noble-Gas Nuclei, Reviews of Modern Physics, 1997, pp. 629-642, vol. 69, No. 2.

REMOVAL OF HOMOGENEOUS CATALYSTS FROM NMR/MRI AGENTS HYPERPOLARIZED VIA SABRE OR PHIP

STATEMENT OF GOVERNMENT SUPPORT

This invention was made with government support under grant numbers CHE-1416268, CHE-1416432, and CHE-1709944 awarded by the National Science Foundation, grant numbers CA202229, EB020323, and CA220137 awarded by the National Institutes of Health, and grant numbers W81XWH-12-1-0159, W81XWH-15-1-0271, and W81XWH-15-1-0272 awarded by the U.S. Department of Defense. The government has certain rights in the invention.

FIELD OF THE DISCLOSURE

The present disclosure generally relates to methods of removing and recovering a homogeneous catalyst from a solution comprising the catalyst and a hyperpolarized agent.

BACKGROUND

Magnetic resonance imaging (MRI) is a powerful imaging method not only because of its ability to distinguish anatomical boundaries of soft tissues without ionizing radiation but also because of its potential to spectrally discern among different biochemical species and physiological states [Kurhanewicz et al., 2011; Weissleder, 2006]. However, the need for much greater detection sensitivity for dilute species has led to growing interest in hyperpolarization [Nikolaou et al., 2015; Hovener et al., 2018; Kovtunov et al., 2018], the generation of highly nonequilibrium population distributions of nuclear spins to dramatically increase the detectable magnetization. Various methods for hyperpolarization have been developed with an eye toward biomedical applications, including spin-exchange optical pumping [Walker and Happer, 1997; Goodson, 2002], dissolution dynamic nuclear polarization [Ardenkjaer-Larsen et al., 2003; Comment, 2016; Lee et al., 2014; Ardenkjar-Larsen, 2016], parahydrogen-induced polarization [Bowers and Weitekamp, 1987; Bowers, 2007; Duckett and Mewis, 2012], and signal amplification by reversible exchange (SABRE) [Adams et al., 2009 (Science); Adams et al., 2009 (J Chem Phys); Rayner and Duckett, 2018]. In particular, SABRE along with its microtesla variant dubbed "SABRE-SHEATH" (for SABRE in shield enables alignment transfer to heteronuclei) [Theis et al., 2015; Truong et al., 2015; Shchepin et al, 2015; Barskiy et al., 2017 (ChemPhysChem); Shchepin et al., 2017 (ChemPhysChem)] have garnered increasing attention because they are rapid and inexpensive to perform, scalable, and do not require major instrumentation. A growing range of biomolecules is amendable to SABRE-SHEATH [Hovener et al., 2018; Colell et al., 2017]. However, reliance on a heavy-metal (Ir-based) catalyst to mediate polarization transfer to a biocompatible substrate presents an obstacle to envisioned clinical applications because of that catalyst's presence in the same solution as the hyperpolarized (HP) agent. Efficient removal of the catalyst while preserving the HP state of the substrate is thus likely necessary before studies with human subjects can be considered.

Generating a pure HP substrate via SABRE necessitates that the catalyst is either heterogeneous (enabling ready separation of the catalyst from the dissolved substrate) or that the homogeneous catalyst is removed somehow from the solution after hyperpolarization transfer to target nuclei. Although progress has been made [Shi et al., 2014; Shi et al., 2015; Kovtunov et al., 2017; Iali et al, 2017; Manoharan et al., 2018; Mewis et al., 2015], each approach demonstrated so far has drawbacks and none have enabled the production of catalyst-free solutions with agents possessing nuclear spin polarizations of several percent. Indeed, such approaches are further complicated by the necessity of the HP nuclei to retain their HP state during (and following) catalyst removal, enabling it to survive all of the way through separation, agent administration, and ultimate MM detection. The present work is thus motivated by the desire for simple methods to efficiently remove standard SABRE catalysts from solution while retaining the HP state of the substrate.

SUMMARY OF THE DISCLOSURE

One embodiment of the present disclosure is a method that embodies a simple and effective route to remove homogeneous catalysts from solutions wherein NMR/MM signal amplification by reversible exchange (SABRE) or parahydrogen-induced polarization (PHIP) is performed—thereby significantly purifying the hyperpolarized substrate or agent while maintaining its hyperpolarized state. Thus, the present disclosure is directed to a method of removing a homogeneous catalyst from a solution comprising the homogeneous catalyst and a hyperpolarized agent, the method comprising contacting the solution comprising the homogeneous catalyst and the hyperpolarized agent with a catalyst removal agent, wherein the catalyst removal agent comprises a sulfur, nitrogen, or oxygen atom, and wherein the sulfur, nitrogen or oxygen atom of the catalyst removal agent bonds with homogeneous catalyst.

Also provided herein is a method of removing a homogeneous catalyst from a solution comprising the homogeneous catalyst and a hyperpolarized agent, the method comprising subjecting a solution comprising the homogeneous catalyst and a hyperpolarization agent to SABRE or PHIP to obtain the solution comprising the homogeneous catalyst and the hyperpolarized agent; contacting the solution comprising the homogeneous catalyst and the hyperpolarized agent with a catalyst removal agent, wherein the catalyst removal agent comprises a sulfur, nitrogen, or oxygen atom, and wherein the sulfur, nitrogen, or oxygen atom of the catalyst removal agent bonds with the homogeneous catalyst; and removing the catalyst removal agent bonded to the homogeneous catalyst from the solution thereby providing a purified solution comprising the hyperpolarized agent, wherein the purified solution is substantially free of the homogeneous catalyst.

A method is also described for recovering a homogeneous SABRE/PHIP catalyst to enable its reuse. For example, a method of recovering a homogeneous catalyst from a solution comprising the homogeneous catalyst and a hyperpolarized agent comprises contacting the solution comprising the homogeneous catalyst and the hyperpolarized agent with a catalyst removal agent, wherein the catalyst removal agent bonds with the homogeneous catalyst; removing the catalyst removal agent bonded to the homogeneous catalyst from the solution thereby providing a purified solution comprising the hyperpolarized agent, wherein the purified solution is substantially free of the homogeneous catalyst; and recovering the homogeneous catalyst from the catalyst removal agent by performing at least one of: (1) applying a catalyst release agent to the catalyst removal agent, wherein the catalyst release agent reacts with the catalyst removal agent to break the bond between the catalyst removal agent and the homogeneous catalyst; or (2) applying energy to the catalyst removal agent, wherein the energy breaks the bond between the catalyst removal agent and the homogeneous catalyst.

DESCRIPTION OF THE DRAWINGS

The following drawings form part of the present specification and are included to further demonstrate certain aspects of the present disclosure. The present disclosure may be better understood by reference to one or more of these drawings in combination with the detailed description of specific embodiments presented herein. However, those of skill in the art will understand that the drawings, described below, are for illustrative purposes only. The drawings are not intended to limit the scope of the present teachings in any way.

DETAILED DESCRIPTION

Figure 1:
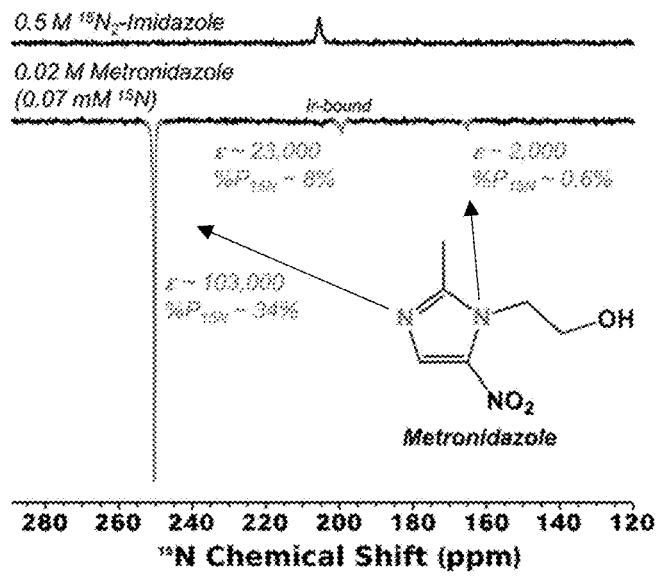
FIG. 1. Bottom: $^{15}N$ spectrum from metronidazole exhibiting 34% $^{15}N$ polarization achieved via SABRE-SHEATH. The Ir-binding nitrogen site of the free substrate exhibited the greatest polarization; the resonance for that nitrogen site for the Ir-bound substrate and the adjacent imidazole nitrogen were polarized 8 and 0.6%, respectively. Top: $^{15}N$ spectrum from thermally polarized $^{15}N_2$-imidazole, used as a reference for calculating polarization enhancement.

One embodiment of the present disclosure is a method that embodies a simple and effective route to remove homogeneous catalysts from solutions wherein NMR/MRI signal amplification by reversible exchange (SABRE) or parahydrogen-induced polarization (PHIP) is performed—thereby significantly purifying the hyperpolarized substrate or agent while maintaining its hyperpolarized state. A method is also described for recovering a homogeneous catalyst to enable its reuse.

One embodiment of the present disclosure is an approach for removing the homogeneous catalysts from a solution containing such catalysts, a hyperpolarized substrate or substrates, solvent molecules, and any other molecules that may or may not be commonly present in a SABRE or PHIP experiment. The homogeneous catalyst can be a SABRE or PHIP catalyst. Typically, the homogeneous catalyst contains at least one metal atom. The metal atom can be, for example, Ir, Rh, Fe, Co, Ni, Ru, Pd, Os, or Pt. Preferably, the metal atom is Ir or Rh.

The homogeneous catalyst is used to perform SABRE (or PHIP) enhancement of an ensemble of NMR-active nuclear spins (e.g. 1H, 2H, 13C, 15N, 19F, 31P, 129Xe, etc.) of a chosen substrate or agent. Thus, a solution comprising the homogeneous catalyst and a hyperpolarization agent is subjected to SABRE or PHIP to obtain a solution comprising the homogeneous catalyst and the hyperpolarized agent. Following hyperpolarization, a substance or substances (i.e., a catalyst removal agent) is/are added to rapidly bind up the catalyst and in so doing, take it out of solution in a single step—leaving behind the substrate (without significant contamination from the catalyst), while it remains in a hyperpolarized state, sufficient for a desired application. That hyperpolarized agent is then administered to the sample or subject as desired.

In order to maintain the hyperpolarized state, in preferred embodiments, the methods disclosed herein are performed in a relatively quick time frame. For example, the removal of the homogeneous catalyst occurs in less than five minutes, less than four minutes, less than three minutes, less than two minutes, less than one minute, or less than thirty seconds.

Alternatively, after hyperpolarization, the solution (containing catalyst, hyperpolarized agent, solvent, etc.) is passed (or forced) through a separation apparatus containing a substance (i.e., a catalyst removal agent) that can rapidly bind up the catalyst, taking it out of solution. Then, the solution passes through the separation apparatus without significant quantities of the homogeneous catalyst (leaving it behind), allowing the remaining solution containing the purified agent or substrate to leave the separation apparatus with its hyperpolarized state intact. The solution containing the hyperpolarized agent or substrate would then be administered as desired to the sample or subject. The separation apparatus can comprise, for example, a column, a syringe, a filtration device, or any other suitable separation apparatus.

These procedures provide a purified solution substantially free of the homogeneous catalyst. The term "substantially free" indicates that at least about 90 wt. %, at least about 93 wt. %, at least about 95 wt. %, at least about 97 wt. %, at least about 99 wt. %, at least about 99.5 wt. %, or at least about 99.9 wt. % of the homogeneous catalyst has been removed from the purified solution. For example, less than 100 ppb, less than 75 ppb, less than 50 ppb, less than 25 ppb, less than 10 ppb, less than 5 ppb, less than 3 ppb, less than 2 ppb, or less than 1 ppb of the homogeneous catalyst remain in the purified solution.

The catalyst removal agent may be an organic or inorganic species (e.g., complex) that chelates (or binds) the metal atom or atoms of the catalyst that renders the catalyst no longer soluble in the liquid phase containing the hyperpolarized substrate, forcing it to rapidly crash out of solution.

The catalyst removal agent may be a solid-phase particle or bead functionalized with surface moieties that are capable of binding or chelating the metal atom or atoms of the catalyst, thereby causing the catalyst to be removed from solution.

For example, the catalyst removal agent can comprise a sulfur, nitrogen, or oxygen atom. The sulfur, nitrogen, or oxygen atom is capable of bonding with the homogeneous catalyst. Thus, the sulfur, nitrogen, or oxygen atom contains at least one free binding site (e.g., one free binding site, two free binding sites, etc.). The free binding site comprises a lone pair of electrons that bond with the homogeneous catalyst.

In various embodiments, the catalyst removal agent is functionalized on a solid-phase particle. The solid-phase particle can comprise $SiO_2$ or polystyrene. For example, the solid-phase particle comprises $SiO_2$. The solid-phase particle can comprise a bead (e.g., a resin bead) comprising $SiO_2$ or polystyrene. Various sizes of beads may be preferable for various applications. In general, the bead can have an average diameter of, for example, from about 10 nm to about 1 mm, from about 1 μm to about 1 mm, or from about 1 μm to about 100 μm. As an example, the bead can have a diameter of about 100 μm. The skilled person will be able to readily determine the appropriate size of bead for the chosen application.

As an example, the catalyst removal agent can comprise at least one of:

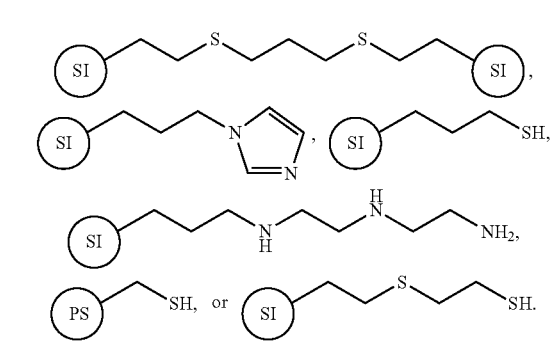

Materials or substances placed in contact with solutions containing hyperpolarized species—or where hyperpolarization would take place—have minimal concentrations of paramagnetic centers that could compromise the hyperpolarized state of the agent or the purified spin order of the para-H2.

Appropriate magnetic or electromagnetic fields would be present (or applied) to either (1) ensure efficient transfer of spin order from either (a) para-H2 to a substrate spin; or (b) one substrate spin to another substrate spin; and/or (2) help maintain the hyperpolarized states of agents at one or more stages of the process.

A molecule or substance capable of binding to both the catalyst and the solid-phase material can be added to the solution containing the homogeneous catalyst and the hyperpolarized substrate. The molecule in question may bind strongly to the metal atom or atoms of the catalyst, but by itself the catalyst would not come out of solution. However, once (for example) solid phase particles of an appropriate functionalization are added to the solution or once the solution is added to a separation apparatus containing the solid phase materials, the catalysts would bind to the particles (or other substances), taking them from the solution (and thus purifying the agent, with its hyperpolarized state intact).

Thus, the methods of the present disclosure function to remove the homogeneous catalyst from a solution comprising the hyperpolarize agent, wherein the hyperpolarized agent maintains its hyperpolarized state in the purified solution.

Another embodiment of the present disclosure is a general approach for recovering the catalysts from the separation medium, and so that they can be reused in additional homogeneous SABRE or PHIP experiments.

In one embodiment, the catalyst removal agent bonded to the homogeneous catalyst is contacted with a catalyst release agent which works to break the bond between the catalyst removal agent and the homogeneous catalyst, thereby returning the catalysts to solution. The free catalysts would then be separated and undergo solvent removal and/or other purification steps in preparation for subsequent re-use. Alternatively, or in addition to contacting the catalyst removal agent bonded to the homogeneous catalyst with the catalyst release agent, energy can be applied to the catalyst removal agent, wherein the energy breaks the bond between the catalyst removal agent and the homogeneous catalyst, thereby returning the catalysts to solution. Such energy can be in the form of, for example, heat, light, and/or electricity. The resulting solution is then treated to allow for solvent removal and/or other purification necessary for re-use of the catalyst.

EXAMPLES

The following non-limiting examples are provided to further illustrate the present disclosure. It should be appreciated by those of skill in the art that the techniques disclosed in the examples that follow represent approaches the inventors have found function well in the practice of the present disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

Example 1. Facile Removal of Homogeneous SABRE Catalysts for Purifying Hyperpolarized Metronidazole, a Potential Hypoxia Sensor The following Examples provide a simple and effective method to remove IrIMes homogeneous polarization transfer catalysts from solutions where NMR signal amplification by reversible exchange (SABRE) has been performed, while leaving intact the substrate's hyperpolarized state. Following microtesla SABRE hyperpolarization of $^{15}N$ spins in metronidazole, addition of $SiO_2$ microparticles functionalized with 3-mercaptopropyl or 2-mercaptoethyl ethyl sulfide moieties provides removal of the catalyst from solution well within the hyperpolarization decay time at 0.3 T ($T_1$ >3 min) and enabling transfer to 9.4 T for detection of enhanced $^{15}N$ signals in the absence of catalyst within the NMR detection region. Successful catalyst removal from solution is supported by the inability to "rehyperpolarize" $^{15}N$ spins in subsequent attempts, as well as by $^1H$ NMR and inductively coupled plasma mass spectrometry. Record-high $^{15}N$ nuclear polarization of up to ~34% was achieved, corresponding to >100 000-fold enhancement at 9.4 T (or >320, 000-fold enhancement at 3.0 T), and approximately ⅝th of the $^{15}N$ hyperpolarization is retained after ~20 s long purification procedure. Taken together, these results help pave the way for future studies, involving in vivo molecular imaging using agents hyperpolarized via rapid and inexpensive parahydrogen-based methods.

Metronidazole, a molecule that has a $^{15}N$ $T_1$ >3 min at 0.3 T [Shchepin et al., 2018], is relatively easy to hyperpolarize [Barskiy et al., 2016 (J Am Chem Soc); Shchepin et al., 2017 (J Phys Chem C)], and possesses biological significance (it is an FDA-approved antibiotic of interest for probing tissue hypoxia) [Barskiy et al., 2016 (J Am Chem Soc); Kizaka-Kondoh and Konse-Nagasawa, 2009], was utilized in the present study. Indeed, we note that metronidazole can be administered in relatively large dose (~2 g per patient [Erickson, 1981]). Moreover, metronidazole contains a nitroimidazole moiety, a structure which is frequently employed in positron emission tomography molecular probes for hypoxia sensing [Kizaka-Kondoh and Konse-Nagasawa, 2009; Procissi et al., 2007; Komar et al., 2008; Fleming et al., 2015; Masaki et al., 2015]. Correspondingly, it is anticipated that when hyperpolarized, this agent will potentially be able to distinguish between hypoxic and normoxic tissues via the $^{15}N$ chemical shift differences that are expected for structures in healthy versus pathological tissues.

Each sample utilized in this Example contains a 20 mM methanol-$d_4$ solution of metronidazole and 1 mM Ir-catalyst precursor [IrCl(COD)(IMes)] (where IMes=1,3-bis(2,4,6-trimethylphenyl)-imidazol-2-ylidene and COD=cyclooctadiene) [Vazques-Serrano et al., 2006; Cowley et al., 2011]; ca. 75-85% parahydrogen (at 75 psi) is administered via bubbling through a 5 mm NMR tube with a flow rate of 150 sccm using an experimental setup described elsewhere [Truong et al., 2014]. The catalyst was activated by bubbling for at least ca. 5-10 min prior to initial NMR acquisition.

A SABRE-SHEATH mixing field of ~1 µT for $^{15}N$ was found to result in $^{15}N$ nuclear spin polarization of up to ~34% for the Ir-binding nitrogen in the free substrate (FIG. 1), which corresponds to an enhancement factor (ε) of ~103 000-fold at 9.4 T and 300 K.

To the inventor's knowledge, such a value represents the greatest $^{15}N$ polarization yet reported among all hyperpolarization methods (moreover, if nearly 100% pH2 [Feng et al., 2012] was employed and assuming an original fraction of ~85%, P of ~42% and ε of ~129 000 would be achieved [Hovener et al., 2018]). At $^{15}N$ natural abundance (0.364%), HP $^{15}N$ signals from that nitrogen in catalyst-bound species and the adjacent imidazole nitrogen of free species was observed (8 and 0.6% polarization, respectively; see TABLE 1 below for a summary of calculations of polarization enhancement). With a long hyperpolarization lifetime [Shchepin et al., 2018] and high $^{15}N$ polarization values, metronidazole represents an ideal candidate to attempt catalyst removal after hyperpolarization. SABRE hyperpolarization of this compound in organic solvent (compared to that in aqueous medium) may be desirable because metronidazole and parahydrogen have significantly greater solubility in organic solvents, enabling preparation of highly concentrated and highly polarized liquids; such an HP liquid prepared in this fashion potentially can be diluted with isotonic buffer in a manner suitable for in vivo injection (e.g., 5 mg/mL solution) [Barskiy et al., 2016 (J Am Chem Soc); Truong et al., 2014].

Figure 2:
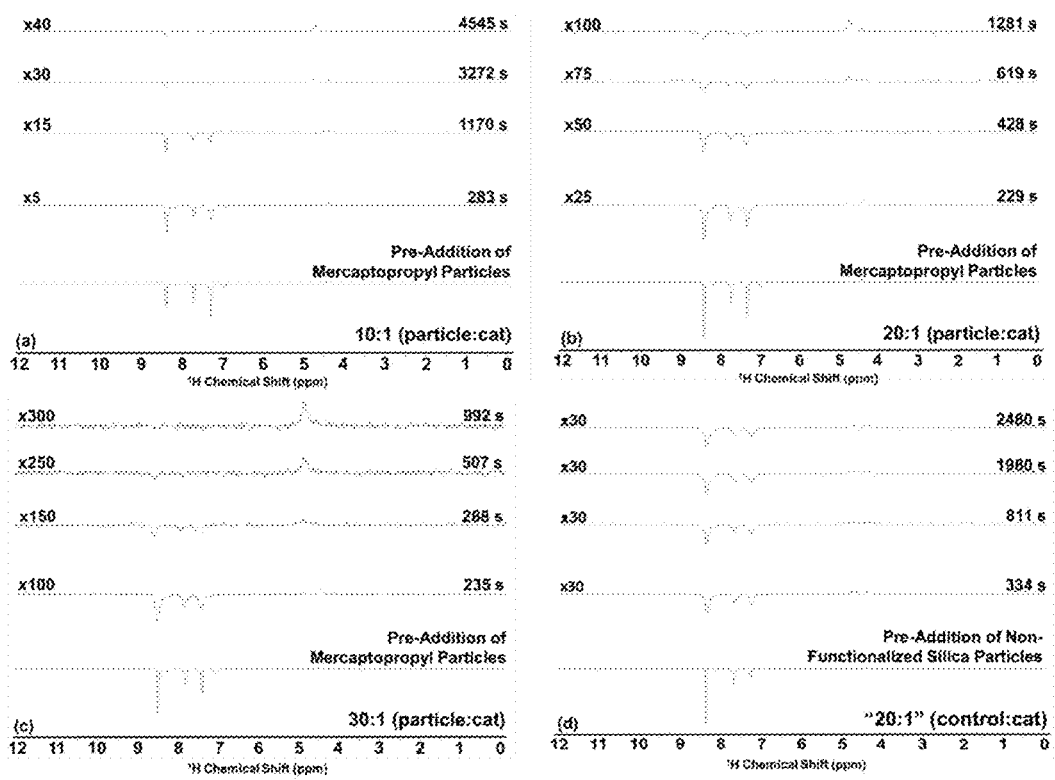
FIG. 2. Selected 1H SABRE spectra of 40 mM pyridine and 4 mM catalyst in 600 as a function of time for varying molar ratios of added functionalized (a, b, and c) and nonfunctionalized (d, control) SiO2 microparticles:catalyst. Spectra were taken on a 400 MHz Oxford magnet with Agilent DD2 spectrometer. The time shown with each spectrum refers to the total time after addition of the microparticles. 3-mercaptopropyl functionalized SiO2 microparticles:catalyst solutions with molar ratios of 10:1 (a), 20:1 (b), and 30:1 (c) show a decrease in 1H SABRE as a function of time, post-microparticle addition, whereas a solution with "20:1" (d) non-functionalized SiO2 microparticles does not (Note: the "20:1" ratio for unfunctionalized SiO2 microparticles refers to a microparticle loading (by mass) that matches that of the actual 20:1 loading for a sample with functionalized microparticles). Molar ratios refer to the total number of molar loadings of the surface functionalization moieties in a given sample solution. Experiments were performed as follows: A solution of the substrate (pyridine, 40 mM) and the Ir-catalyst (4 mM) in 600 µL deuterated methanol was placed in an NMR tube and attached to the para-H2 bubbler and pressurized to 75 psi. Following ~15 min. of hydrogen bubbling to activate the catalyst, SABRE was performed by administering para-H2 bubbling for 15 s at ~5.2 mT, after which the sample was rapidly transferred to 9.4 T for 1H acquisition at 400 MHz to obtain the "pre-addition" spectrum for a given sample (repeated in triplicate). The sample was de-pressurized to 1 atm and a specified amount of SiO2 microparticles (functionalized or non-functionalized) was carefully added to the solution. Upon microparticle addition, a timer was started and the sample was immediately re-connected to the para-H2 manifold and re-pressurized to 75 psi. Once re-pressurized, the sample was bubbled for 15 s at ~5.2 mT and then rapidly transferred to 9.4 T for 1H acquisition. The SABRE/NMR-acquisition cycle was repeated until hyperpolarization ceased or the level of hyperpolarization did not change (d).
Figure 3:
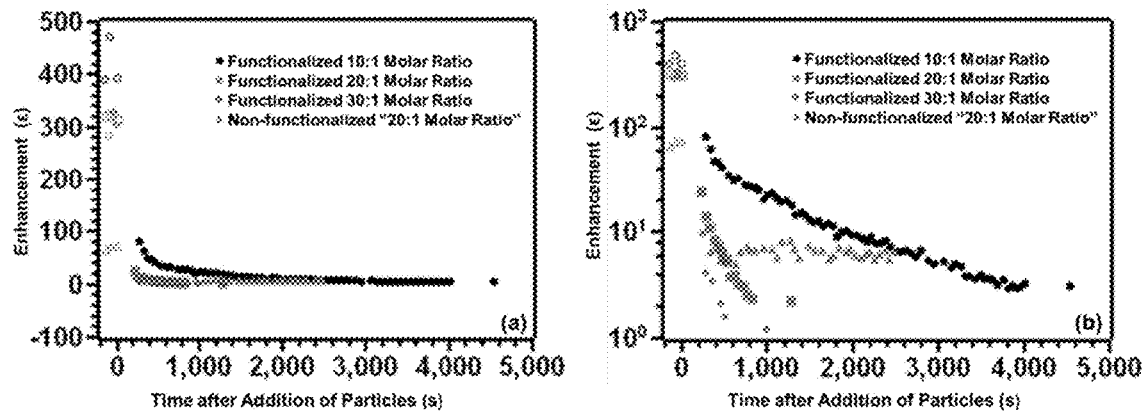
FIG. 3. (a) 1H SABRE Enhancement (c) of the pyridine ortho1H position (8.53 ppm) as a function of time after addition of 3-mercaptopropyl functionalized silica microparticles using various molar ratios of functionalized SiO2 microparticles:catalyst. (b) is the same data as in (a) but illustrated on a logarithmic scale for the enhancement versus time, allowing for better comparison of the various molar ratios tested. Data presented in FIG. 51 are selected spectra from each sample series shown in the present figure.

The functionalized $SiO_2$ microparticles (3-mercaptopropyl and 2-mercaptoethyl ethyl sulfide) investigated here are commercially available (Sigma 538086 and Sigma 745111) and do not require post-synthetic modifications. The surface functional moieties are terminated with strongly binding sulfur atoms that in principle can rapidly remove the catalyst from solution (ideally, on a time scale<<$T_1$). To provide a rough estimate of the amount of functionalized $SiO_2$ microparticles necessary to complete catalyst removal, $^1H$ SABRE enhancement (several hundred fold) as a function of time (after $SiO_2$ particle addition) was studied first, using 40 mM solutions of a test substrate (pyridine, also containing 4 mM catalyst in methanol-d$_4$; FIG. 2). These preliminary experiments were initiated by activating the catalyst with about 5-10 min of parahydrogen bubbling, performing SABRE at ~10 mT, and then measuring the SABRE enhancement at 9.4 T prior to particle addition; once a $^1$H enhancement baseline was established, functionalized (3-mercaptopropyl) or non-functionalized (control) SiO$_2$ microparticles were added to the solution. $^1$H SABRE experiments were then repeated and the decreasing $^1$H SABRE enhancement was recorded over time. Indeed, subsequent $^1$H SABRE spectra showed drastic reductions in enhancement as a function of time for solutions containing functionalized SiO$_2$ microparticles, where the fastest decay (within ~250 s) occurred for microparticle/catalyst molar ratios of 30:1 (FIG. 3). However, corresponding solutions of non-functionalized SiO$_2$ microparticles did not show a change in enhancement over ~2000 s following an initial loss likely attributable to physisorption of the catalyst.

Figure 4:
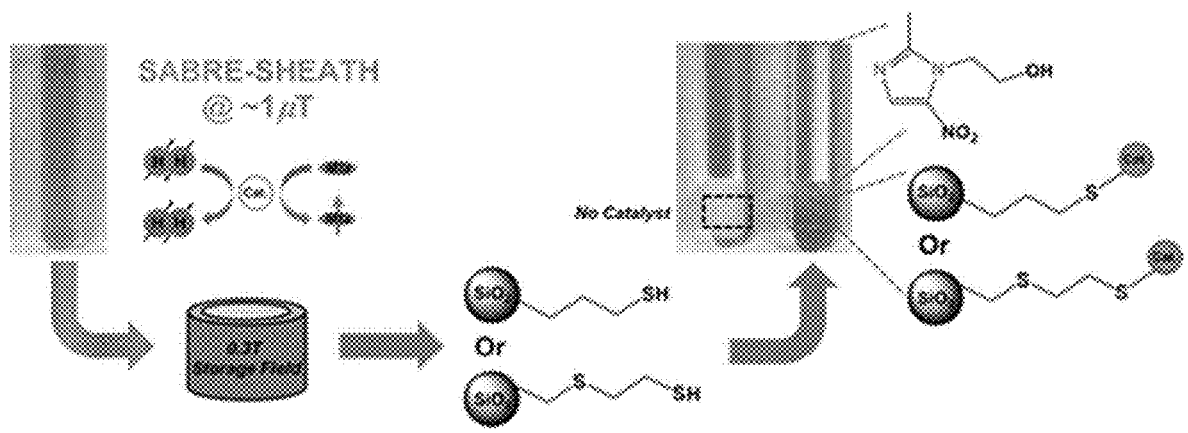
FIG. 4 is a schematic of the experiment. After polarization transfer to $^{15}N$ of metronidazole at ~1 µT (within a magnetic shield, not shown), the solution is transferred to a 0.3 T storage field, where the $^{15}N$ $T_1$ is long. The sample is depressurized and functionalized (3-mercaptopropyl or 2-mercaptoethyl ethyl sulfide) or nonfunctionalized (control) SiO$_2$ microparticles are added, which in the former cases cause the catalyst to be removed from solution while retaining high levels of the substrate's $^{15}N$ polarization.

Informed by the above results (which indicated the need for large molar ratios of surface functionalization to catalyst), the experimental procedure used for obtaining enhanced $^{15}$N spectra from metronidazole with catalyst removal is summarized in FIG. 4.

To rapidly remove homogeneous catalyst species from solution, microparticle/catalyst molar ratios of ~170:1 (3-mercaptopropyl) and ~142:1 (2-mercaptoethyl ethyl sulfide) were used. Immediately following hyperpolarization transfer to $^{15}$N at ~1 µT, the solution is transferred to a ~0.3 T storage field (where $^{15}$N T$_1$ is >3 min [Shchepin et al., 2018]), depressurized to 1 atm, and then ~85 mg of the functionalized or non-functionalized SiO$_2$ microparticles was added to the solution. The solution was bubbled with parahydrogen for ~5 s to ensure good mixing and then immediately transferred to 9.4 T for detection. This entire process takes ~20 s and can likely be significantly accelerated (and even automated) with a more streamlined apparatus.

Figure 5:
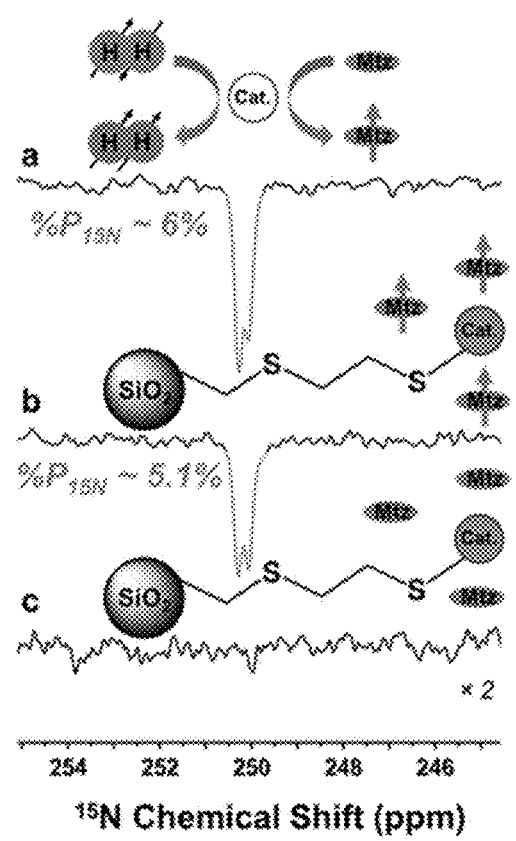
FIG. 5 shows $^{15}N$ SABRE-SHEATH spectra from metronidazole (naturally abundant in $^{15}N$ spins) at different stages: First, high levels of $^{15}N$ polarization prior to microbead addition were seen (a). $^{15}N$ hyperpolarization is retained after addition of 2-mercaptoethyl ethyl sulfide-functionalized silica (b). Any attempt to rehyperpolarize the solutions yielded no enhancements for the functionalized SiO$_2$ solutions (c).
Figure 6:
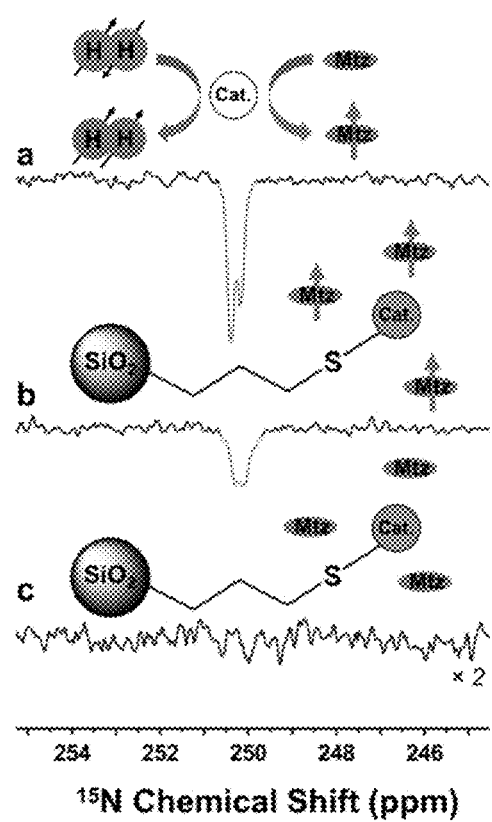
FIG. 6 shows $^{15}N$ SABRE-SHEATH spectra from metronidazole (naturally abundant in $^{15}N$ spins) at different stages: First, high levels of $^{15}N$ polarization prior to microbead addition was seen (a). $^{15}N$ hyperpolarization is retained after addition of 3-mercaptopropyl functionalized silica microparticles (b). Any attempt to re-hyperpolarize the solutions yielded no enhancements for the functionalized SiO$_2$ solutions (c).
Figure 7:
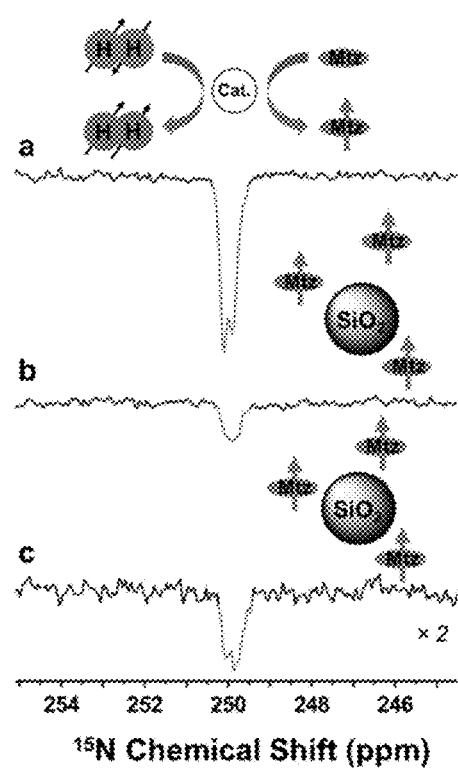
FIG. 7 shows $^{15}N$ SABRE-SHEATH spectra from metronidazole (naturally abundant in $^{15}N$ spins) at different stages: First, high levels of $^{15}N$ polarization prior to microbead addition was seen (a). $^{15}N$ hyperpolarization is retained after addition of non-functionalized SiO$_2$ microparticles (b). Any attempt to re-hyperpolarize the solution showed similar enhancements (c) to (b).

Results obtained with metronidazole (naturally abundant in $^{15}$N spins, hyperpolarized via SABRE-SHEATH) are summarized in FIGS. 5, 6, and 7; all enhancement calculations are summarized in TABLE 2.

Figure 8:
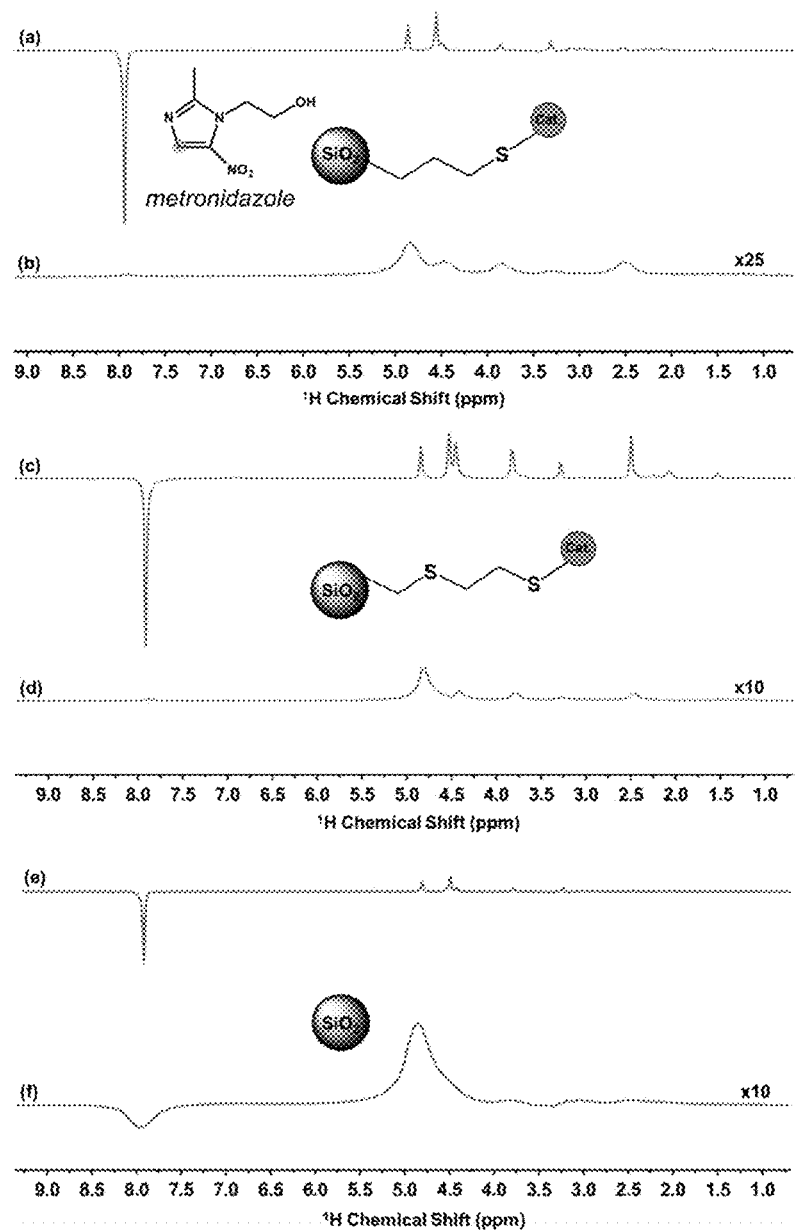
FIG. 8 shows $^1H$ SABRE of 20 mM metronidazole and 1 mM catalyst prior to the addition of functionalized (a and c) and non-functionalized (e) SiO2 microparticles. Corresponding attempts to observe 1H SABRE post-addition of functionalized SiO$_2$ microparticles are shown in (b, 170:1 ratio of microparticle:catalyst), (d, 142:1 ratio of microparticle:catalyst) and (f, "170:1" ratio of microparticle:catalyst), respectively. Only the sample containing non-functionalized SiO2 microparticles (f) shows $^1H$ SABRE after microparticles were added and an attempt to rehyperpolarize metronidazole was performed, indicating the presence of significant amounts of free catalyst in solution in (f) but not in (b) or (d).
Figure 9:
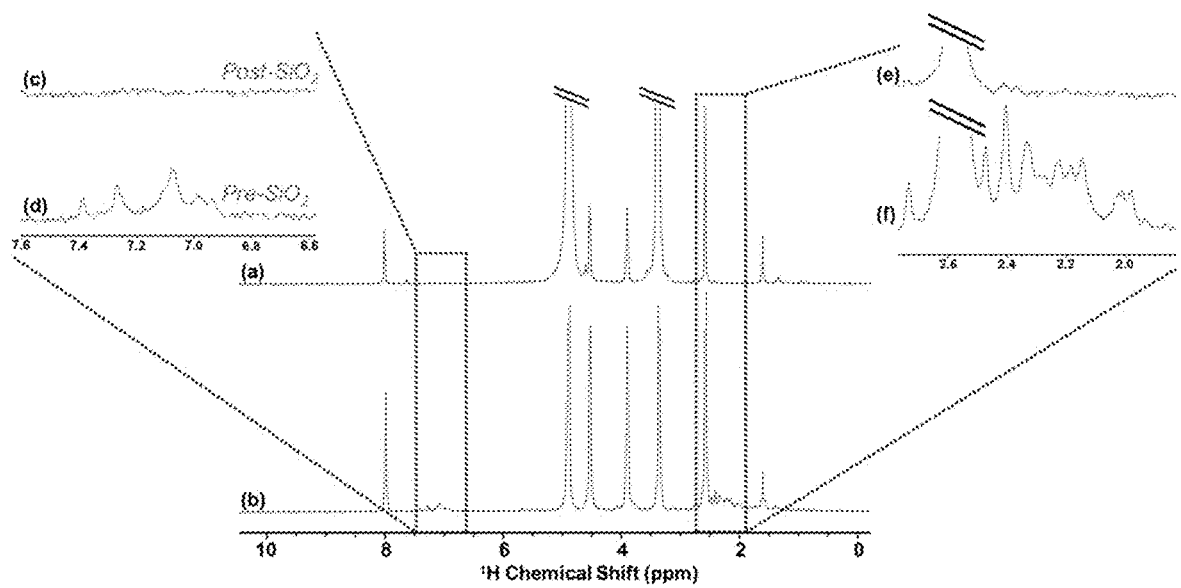
FIG. 9 shows a high-resolution $^1H$ NMR spectra of a 20 mM metronidazole and 1 mM catalyst solution before (b, d, f) and after (a, c, e) addition of 3-mercaptopropyl functionalized silica microparticles to the solution and subsequent filtration (with a filter syringe) of the microparticles after ~5 mins. The aromatic (c and d) and aliphatic (e and f) regions that would contain characteristic signatures of the catalyst are magnified in order to better illustrate the effective removal of the catalyst by the functionalized SiO2 microparticles. 1H NMR spectra were acquired with 128 scans and a relaxation delay time of 10 s.

First, enhanced $^{15}$N spectra obtained prior to particle addition for three different runs are shown in FIGS. 5A, 6A, and 7A. FIGS. 5B, 6B, and 7B show significant retention of $^{15}$N hyperpolarization after each type of SiO$_2$ microparticles was added. Importantly, the functionalized microparticles (FIGS. 5B and 6B) took on a pale yellow color similar to the catalyst, whereas the supernatant liquid became clear (see photos in FIG. 4), consistent with the rapid removal of catalyst molecules from the solution as a result of binding to the microparticles. The decreases in signal intensity (and hence hyperpolarization level) are likely due to T$_1$ losses, for example, FIG. 5 demonstrates that ~84% of the initial $^{15}$N polarization was retained after the ~20 s long purification procedure. After detection at 9.4 T, "rehyperpolarizatiom" of the $^{15}$N spins of the substrate was attempted, but no detectable $^{15}$N enhancement was observed for the two samples containing functionalized SiO$_2$ microparticles, again supporting the effective absence of catalysts in the supernatant solution. However, similar hyperpolarization levels for the sample containing non-functionalized SiO$_2$ microparticles was achieved (see additional discussion below). These results are also corroborated by corresponding $^1$H SABRE studies with these types of samples (FIG. 8). Moreover, a high-resolution $^1$H NMR spectrum of the supernatant liquid following addition of 3-mercaptopropyl-functionalized microparticles did not contain signals from the SABRE catalyst (FIG. 9). Finally, inductively coupled plasma mass spectrometry (ICP-MS) elemental analysis of solutions obtained using similar concentrations and approach (and with volumes scaled up by ~25-fold) found that >98% of the catalyst had been removed (see additional discussion below), consistent with the NMR results.

In summary, a simple and effective method is reported for removal of the most potent homogeneous IrIMes SABRE catalyst from solutions containing HP agent. The method uses inexpensive and commercially available microparticles, 5 mm NMR tubes, and it is sufficiently rapid ($\ll$T$_1$) to enable detection of NMR signals from substrates with intact HP states, in the apparent absence of dissolved catalysts (maintaining $^{15}$N polarization levels of up to >84% of the initial value). The entire procedure from beginning of hyperpolarization to the end of the purification process requires less than 1.5 min. It is envisioned that the purified HP metronidazole organic solution can be transferred from the 5 mm NMR tube-based setup into a syringe partially filled with isotonic saline buffer via a catheter and particle filter for subsequent in vivo injection. Moreover, larger volumes with higher concentrations of catalyst, parahydrogen, and agent (as well as agent isotopic labeling) should be easily amenable to the present approach along with the use of other agents (including the recent demonstration of SABRE-hyperpolarized cleavable metabolic agents [Kidd et al., 2018]). Cartridges or other devices can also be developed that can be integrated with these setups to increase the efficiency of the process while minimizing polarization losses during catalyst removal and/or agent separation. These results, combined with observation of record $^{15}$N polarization of up to 34% in metronidazole, bode well for a wide range of envisioned in vivo molecular imaging applications [Goodson et al., 2015].

Calculation of SABRE Enhancement and Polarization Factors.

$^1$H SABRE and $^{15}$N SABRE-SHEATH enhancements were calculated using the following equation:

$$\varepsilon = \left(\frac{S_{HP}}{S_{REF}}\right) \times \left(\frac{[REF]}{[HP]}\right) \times \left(\frac{A_{REF}}{A_{HP}}\right),$$

where $\varepsilon$ is the calculated enhancement, $S_{HP}$ is the absolute integral of the signal from the hyperpolarized species, $S_{REF}$ is the absolute integral of the signal from a thermally polarized reference sample, [REF] is the concentration of the thermally polarized species providing the signal (here 0.5 M $^{15}$N$_2$-imidazole, 1.0 M in spin), [HP] is the concentration of the hyperpolarized species (specifically, the concentration of the hyperpolarized spin in question), $A_{REF}$ is the cross-sectional area of the NMR tube of the thermally polarized reference sample, and $A_{HP}$ is the cross-sectional area of the NMR tube of the hyperpolarized sample (here $A_{REF}/A_{HP}$=1.12). For example, the concentration of the $^{15}$N spins in the "free" (i.e. unbound to the catalyst) substrate was calculated by taking the initial concentration of the substrate (20 mM), subtracting the fraction that should be bound to the 1 mM catalyst (3 mM) and then multiplying by the natural abundance of $^{15}$N (0.364%). TABLE 1 shows a summary of polarization enhancement calculations. With a long hyperpolarization lifetime and high $^{15}$N polarization values, metronidazole represents an ideal candidate to attempt catalyst removal post-hyperpolarization.

TABLE 1

Calculations of $^{15}N$ signal enhancements and polarization levels for FIG. 1.

|  | $^{15}N$ - Free | $^{15}N$ - Bound | $^{15}N$ - Free |
| --- | --- | --- | --- |
| $S_{REF}$ | 419600.16 | 419600.16 | 419600.16 |
| $S_{HP}$ | 2388804.01 | 95202.11 | 39404.47 |
| [REF] | 1.0M | 1.0M | 1.0M |
| [HP] | 0.06188 mM | 0.01092 mM | 0.06188 mM |
| ε | 103041.59 | 23270.53 | 1699.72 |
| % $P_{15N}$ | 34.0% | 7.7% | 0.56% |

TABLE 2

Calculations of $^{15}N$ signal enhancements and polarization levels for FIG. 5. The same reference signal is used.

|  | $SiO_2$ (before) 3-mercaptopropyl | $SiO_2$ (before) 2-mercaptoethyl ethyl sulfide | $SiO_2$ (before) control |
| --- | --- | --- | --- |
| $S_{REF}$ | 419600.16 | 419600.16 | 419600.16 |
| $S_{HP}$ | 243517.24 | 255801.89 | 575423.77 |
| [REF] | 1.0M | 1.0M | 1.0M |
| [HP] | 0.06188 mM | 0.06188 mM | 0.06188 mM |
| ε | 17350.64 | 18225.92 | 40999.03 |
| % $P_{15N}$ | 5.7% | 6.0% | 13.5% |

|  | $SiO_2$ (after) 3-mercaptopropyl | $SiO_2$ (after) 2-mercaptoethyl ethyl sulfide | $SiO_2$ (after) control |
| --- | --- | --- | --- |
| $S_{REF}$ | 419600.16 | 419600.16 | 419600.16 |
| $S_{HP}$ | 138816.9 | 215643.6 | 133908.18 |
| [REF] | 1.0M | 1.0M | 1.0M |
| [HP] | 0.06188 mM | 0.06188 mM | 0.06188 mM |
| ε | 9890.72 | 15364.64 | 9540.98 |
| % $P_{15N}$ | 3.3% | 5.1% | 3.1% |

Additional Spectra and Graphs.

All spectra shown were acquired on a 400 MHz Bruker AVANCE III unless otherwise specified.

Check of Catalyst Separation Efficiency via ICP-MS Elemental Analysis.

Analytical determination of the iridium concentration after a catalyst removal procedure (similar to those utilized in the NMR experiments described in this work) was achieved by Inductively Coupled Plasma Mass Spectrometry (ICP-MS), performed by the Carbondale Public Works Central Laboratory (Carbondale, Ill. USA). Two separate samples were prepared using 15 mL each of a methanol solution containing 1 mM of the standard SABRE (IrIMes) catalyst and 20 mM of metronidazole as a substrate (thus amounts/volumes were scaled up by ~25-fold compared to the NMR experiments). Each sample solution was placed in a simple reaction vessel comprising a piece of ¼-inch o.d. PTFE tubing (with sufficient volume to accommodate the sample), stoppered at the bottom with a ¼-inch push-to-connect fitting, and with a wye adapter attached at the top. The wye adapter allowed the reaction vessel to be connected to the H2 bubbler such that the gas could be delivered to the bottom of the liquid sample via ¹⁄₁₆-inch PTFE capillary tubing. The catalyst molecules in the solution were activated by bubbling with ~75 psi of room-temperature, standard purity hydrogen for ~1 hr. The longer activation/bubbling time used for these samples (compared to the NMR samples) was employed to help account for the much larger reaction volumes. Each sample solution was then decanted into a vial containing 1.775 g of 3-mercaptopropyl functionalized silica beads. This amount corresponds to a 142:1 molar ratio of bead functional groups to Ir (a number somewhat lower than that used in the NMR experiments with these particles, but equivalent to the ratio used with the other (2-mercaptoethyl ethyl sulfide) functionalized particles). The vial was shaken by hand for several minutes and the supernatant was removed and separated from the beads by first extracting the liquid with syringes, then extruding the contained liquid through syringe filters (0.2 μm, Sigma) into a round-bottom flask. The supernatant was then dried on a roto-evaporator and re-dissolved in 15 mL 10% HCl/milli-q water solution [Shi et al., 2016]. Both samples were then taken to the Carbondale Public Works Central Laboratory for analysis. Samples were then diluted to 50 mL and digested with hydrochloric acid and nitric acid. Analysis was performed using an ICP-MS instrument (ThermoFisher iCAPQ) according to EPA method 200.8 [U.S. EPA, 1994]. Results are summarized below in TABLE 3; concentrations reported are for the 15 mL samples (i.e. dilution was taken into account).

TABLE 3

Results from ICP-MS Elemental Analysis, Concerning Ir Removal Using 3-Mercaptopropyl Functionalized Silica Particles.

| Sample/Value | Ir Content (g/L) | Percent Ir Remaining in Soln. |
| --- | --- | --- |
| 1 | 0.0019534 g/L | 1.0163% |
| 2 | 0.0042709 g/L | 2.222% |
| Average (1, 2) | 0.0031125 g/L | 1.619% |
| Theoretical, without catalyst removal (1 mM solution) | .1922 g/L | N/A |

$SiO_2$ microparticles functionalized with 3-mercaptopropyl or 2-mercaptoethyl ethyl sulfide were used to remove standard homogeneous catalysts from solutions prepared by Signal Amplification By Reversible Exchange (SABRE) for nuclear magnetic resonance imaging. The functionalized $SiO_2$ microparticles were added to solution following microTesla SABRE hyperpolarization of $^{15}N$ spins in metronidazole. Removal of the catalysts (iridium-based in the embodiments described herein) from solution occurs well within the hyperpolarization decay time at 0.3 T. The present catalyst removal technique enables transfer to 9.4 T for detection of enhanced $^{15}N$ signals in the absence of free catalyst molecules within the NMR detection region. Successful catalyst removal from solution is supported by the inability to "re-hyperpolarize" $^{15}N$ spins in subsequent attempts, as well as by $^1H$ NMR. Record-high $^{15}N$ nuclear polarization of up to ~34% was achieved, corresponding to >100,000-fold signal enhancement. The results are unexpected due both to effective binding of an iridium-based catalyst and the surprisingly good retention of hyperpolarization exhibited in the resulting, catalyst-free product.

The results reported herein are unexpected for two reasons. First, subsequent processing of hyperpolarized solutions is well known in the art to reduce or eliminate the desired hyperpolarization so as to render the resulting product poor or unusable. The good retention of hyperpolarization following catalyst removal reported herein is thus surprising. Second, the catalysts removed from the embodiment solutions described herein were iridium-based. Known methods to bind platinum-family metals are generally not effective for iridium, with activated carbon being the only effective previously known scavenger for iridium. The effectiveness of functionalized silica in binding iridium is thus unexpected.

Example 2. SABRE and Rapid Filtration Enable Metal-Free Hyperpolarized Contrast Agents Parahydrogen-Based Nuclear Spin Hyperpolarization.

Figure 10:
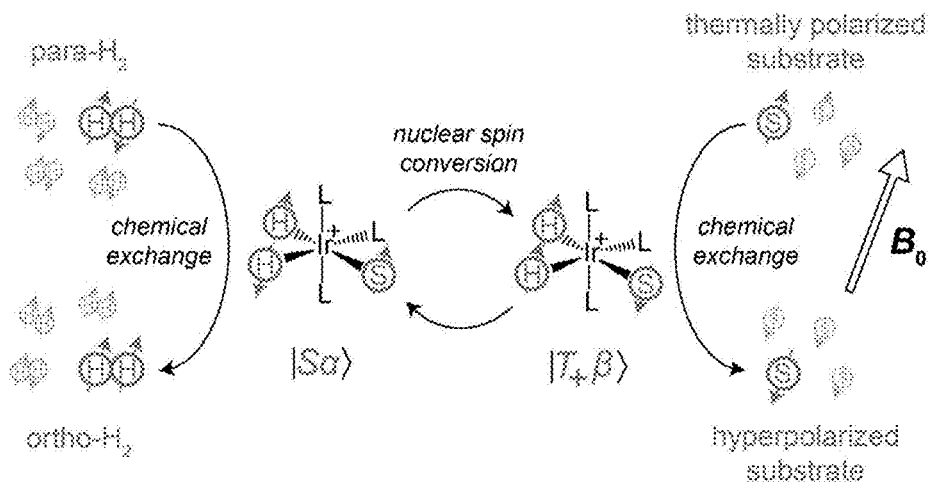
FIG. 10 is a schematic diagram of the SABRE process: coherent polarization transfer from parahydrogen-derived hydrides to a substrate's nuclear spin (denoted as "S") in iridium complex acting as a magnetization transfer catalyst. Both para-H2 and substrate are in reversible exchange with the Ir complex.

Hyperpolarization techniques are revolutionizing the fields of NMR and MRI by permitting a variety of novel applications. Hyperpolarization techniques based on the use of parahydrogen (the nuclear spin isomer of a hydrogen molecule with total nuclear spin I=0), such as parahydrogen-induced polarization (PHIP) and signal amplification by reversible exchange (SABRE), are especially attractive [Bowers and Weitekamp, 1987; Adams et al., 2009 (Science)]. FIG. 10 shows a schematic of the SABRE process. Indeed, PHIP and SABRE provide orders of magnitude NMR signal enhancement in seconds, without requirements of sophisticated equipment and without fundamental scalability difficulties. However, the main drawback that limits the widespread applicability of PHIP/SABRE in biomedicine is the presence of organometallic compounds (the polarization transfer catalysts) in the same solution with hyperpolarized contrast agents. These catalysts typically are complexes of the platinum-group metals; thus, their administration in vivo should be avoided. For the last decade, there have been numerous efforts to develop heterogeneous (HET) PHIP/SABRE catalysts [Koptyug et al., 2007; Kovtunov et al., 2013; Zhou et al., 2015; Shi et al., 2014], typically in the form of solid particles which are able to facilitate hyperpolarization of liquids and gases mixed with parahydrogen. While the field of HET-PHIP/SABRE is under development, so far there are no reports of high (>5%) polarization of relevant biomolecules, a threshold for biomedical applications [Golman and Petersson, 2006].

SABRE Catalyst Extraction and Filtration Results.

Here two approaches of removing the polarization catalyst from the solution of a SABRE-hyperpolarized compound are demonstrated. A first approach is based on the rapid extraction of the hyperpolarized agent from an organic phase (in which hyperpolarization is performed) to an aqueous phase. While this approach enables a fast transfer of a hyperpolarized agent to an aqueous phase (FIG. 11), however, the activated complex is transferred to an aqueous phase as well [Truong et al., 2014]. A second approach is based on the use of silica-based metal scavengers, shown in TABLE 4. TABLE 5 further includes filter masses and filtration percentages.

TABLE 4

Silica-based metal scavengers used in this work.

| Filter # | Filter Name | Structure |
|---|---|---|
| 1 | 3-Mercaptopropyl Ethyl Sulfide Silica | |
| 2 | QuadraPure BDZ | |
| 3 | QuadraSil MP | |
| 4 | QuadraSil TA | |
| 5 | (Mercaptomethyl)polystyrene | |
| 6 | 2-Mercaptoethyl Ethyl Sulfide Silica | |

TABLE 5

Mass of the added filter 3 and a filtration percentage measured by ICP-AES.

| Mass of the added filter (mg) | Filtration Percentage (%) |
|---|---|
| 0 | 0.0000 |
| 10 | 0.5803 |
| 20 | 0.8176 |
| 30 | 0.9216 |
| 40 | 0.9529 |
| 50 | 0.9687 |
| 75 | 0.9906 |
| 100 | 0.9957 |

Figure 14:
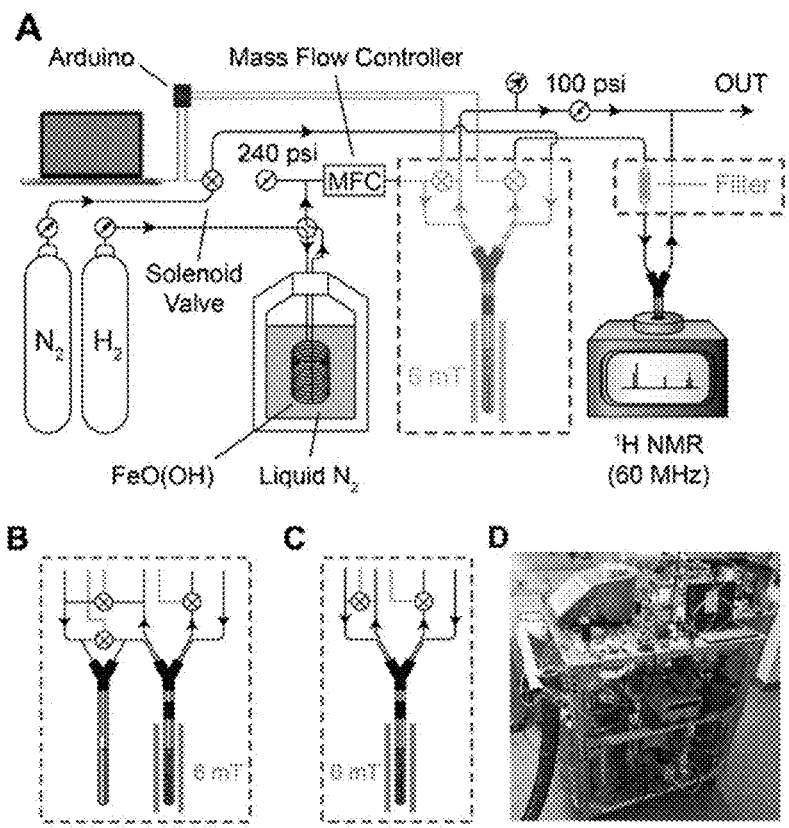
FIG. 14. A) Schematic diagram of the automated experimental setup employed to perform SABRE hyperpolarization and extraction/filtration of a hyperpolarized compound from a metal catalyst. Para-H2 gas was produced by passing normal H2 gas (a mixture of 25% para-H2 and 75% of ortho-H2) through a spiral tube filled with FeO(OH) powder in a Dewar filled with liquid N2. Solenoid valves controlled via Arduino board were used to switch on and off the flow of gases (H2 and N2). SABRE hyperpolarization was carried out in a reaction chamber located in the electromagnet with an optimal magnetic field (6 mT) under 100 psi and 240 sccm of para-H2 flow. N2 gas was used to push the hyperpolarized solution to an NMR tube located in the 60 MHz NMR spectrometer (Nanalysis) where detection of 1H NMR spectra of hyperpolarized solutions was performed. B) Modification of the setup depicted in (A) for carrying out rapid extraction experiments. A tube filled with DI water is depicted on the left. By closing the corresponding valve, water was pushed to a polarization chamber where rapid extraction (FIG. 11a) was performed. C) Modification of the setup depicted in (A) for carrying out rapid filtration experiments. A filter was located in a small tube near the entrance to the NMR tube located in the NMR spectrometer. D) Photograph of the automated experimental setup employed to perform SABRE hyperpolarization and extraction/filtration of a hyperpolarized compound from a metal catalyst.

For extraction experiments, SABRE hyperpolarization and the most studied SABRE substrate, pyridine, were used. Polarization build-up was carried out in the organic phase (1:1 mixture of benzene and ethanol), and the extraction of hyperpolarized pyridine was carried out by automated addition of the water and the efficient mixing of the two phases. Hyperpolarized pyridine and ethanol (as well as some organometallic catalyst) were shown to be transferred to water by 1H NMR and ICP. Experiments were carried out using a home-built automatically controlled polarizer (FIG. 14). The polarization/extraction chamber was operated at ~7 atm. When the extraction process was completed, the aqueous phase was ejected into an NMR tube located in a 60 MHz benchtop NMR spectrometer (NMReady-60PRO, Nanalysis) for 1H NMR signal detection.

SABRE-catalyst methanol solutions were prepared by mixing Iridium complex precursor [Ir(IMes)(COD)Cl] with >10 equivalents of pyridine in $CH_3OH$. The orange color solutions were activated by bubbling pure $H_2$ gas through the mixture with mass flow rate 50 scc/min under 50 psi for 30 minutes until the solution turned almost transparent. Aqueous solutions of the activated complex were prepared by evaporating $CH_3OH$ and re-dissolving the solution in $DI-H_2O$.

Figure 12:
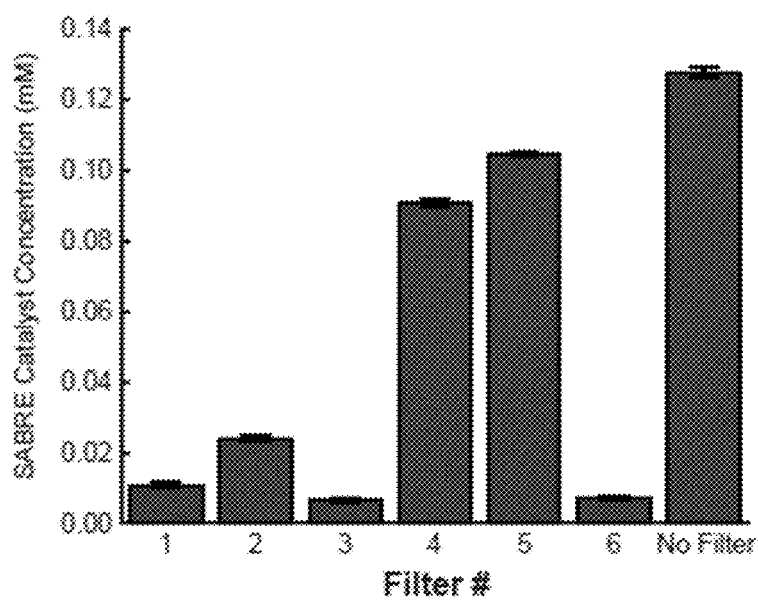
FIG. 12 shows concentration of the [Ir(IMes)(py)3H2]Cl (IMes=1,3-bis(2,4,6-trimethylphenyl)imidazol-2-ylidene, COD=cyclooctadiene, py=pyridine) detected by ICP-AES after overnight storage of an aqueous solution in the presence of different different metal scavengers (10 mg).
Figure 13:
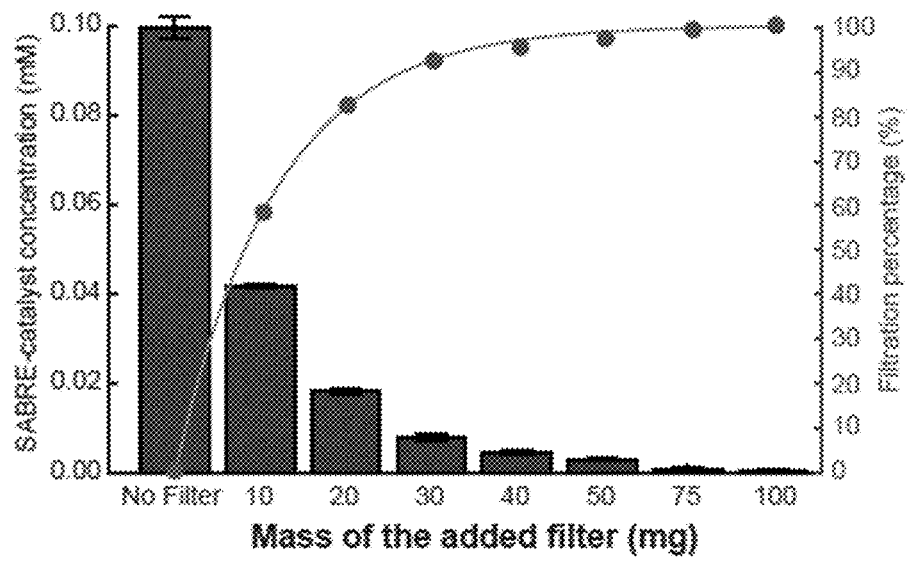
FIG. 13 shows concentration of the [Ir(IMes)(py)3H2]Cl (IMes=1,3-bis(2,4,6-trimethylphenyl)imidazol-2-ylidene, COD=cyclooctadiene, py=pyridine) detected by ICP-AES after rapid filtration (<10 s) of the aqueous solution by different amount of the added metal scavenger 3. Filtration percentage is shown on the right.

Inductively Coupled Plasma Atomic Emission Spectroscopy (ICP-AES) was utilized to measure the amount of Ir complex in aqueous solutions before and after filtration experiments (FIGS. 12, 13). ICP calibration was done using sodium hexachloroiridate(IV) hexahydrate.

Figure 15:
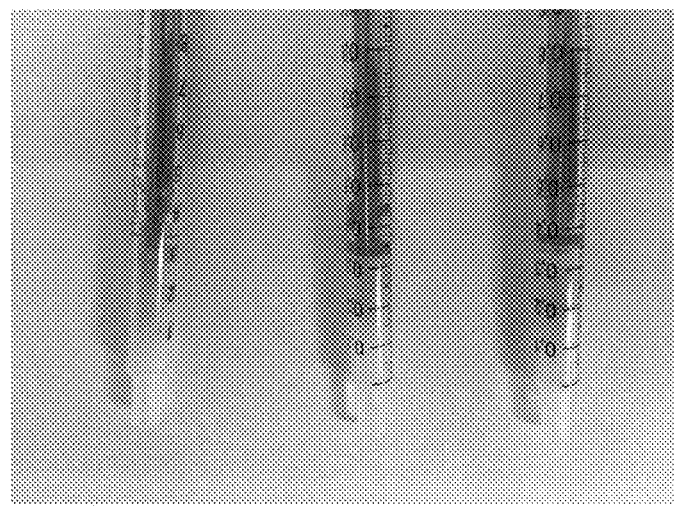
FIG. 15 is a photograph of the syringes containing filter #3 (QuadraSil MP) scavenger powder after the SABRE-catalyst-containing aqueous solution was put through them.

FIG. 15 is a photograph of the syringes containing filter #3 powder after the SABRE-catalyst-containing aqueous solution was put through them. Note that the initial SABRE-catalyst-containing solution looks almost transparent.

Figure 16:
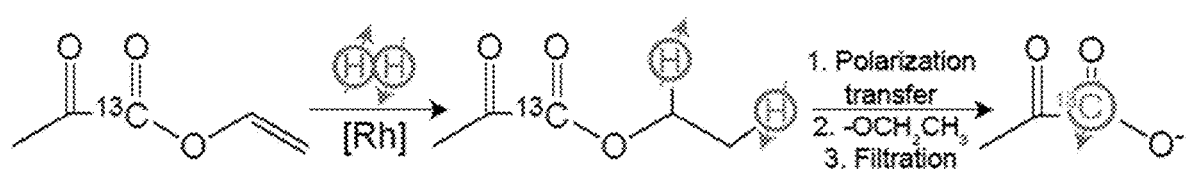
FIG. 16. PHIP and side-arm hydrogenation, a method that allows to achieve hyperpolarization on a tailored precursor containing a hydrogenable functionality that, after polarization transfer to the target 13C moiety, is cleaved to obtain the metabolite of interest.

Presented results highlight tremendous opportunities for PHIP and SABRE to become accessible and fast means of producing pure hyperpolarized contrast agents for biomedical use. SABRE allows to polarize important nitrogen-containing heterocycles, such as imidazole (promising pH-sensor, due to >30 ppm15N chemical shift dispersion in physiological pH range) [Shchepin et al., 2016 (ACS Sensors)] and metronidazole (powerful hypoxiatargeting agent) [Barskiy et al., 2016 (J Am Chem Soc)]. PHIP and side-arm hydrogenation (SAH) (FIG. 16) make possible polarization of virtually any biologically-relevant metabolite of interest by hydrogenating a precursor containing a hydrogenable functionality that, after polarization transfer to the target 13C moiety, is cleaved to obtain the metabolite of interest [Reineri et al., 2015]. PHIP-SAH polarization of acetate, lactate, and pyruvate was successfully demonstrated [Cavallari et al., 2018; Shchepin et al., 2016 (Angew Chem Int Ed)].

Example 3. Rapid Catalyst Capture Enables Metal-Free Para-Hydrogen-Based Hyperpolarized Contrast Agents Hyperpolarization techniques based on the use of para-hydrogen provide orders of magnitude signal enhancement for magnetic resonance spectroscopy and imaging. The main drawback limiting widespread applicability of para-hydrogen-based techniques in biomedicine is the presence of organometallic compounds (the polarization transfer catalysts) in solution with hyperpolarized contrast agents. These catalysts are typically complexes of platinum-group metals, and their administration in vivo should be avoided. Herein, extraction of a hyperpolarized compound from an organic phase to an aqueous phase combined with a rapid (less than 10 s) Ir-based catalyst capture by metal scavenging agents is shown and can produce pure para-hydrogen-based hyperpolarized contrast agents, as demonstrated by high-resolution nuclear magnetic resonance (NMR) spectroscopy and inductively coupled plasma atomic emission spectroscopy (ICP-AES). The presented methodology enables fast and efficient means of producing pure hyperpolarized aqueous solutions for biomedical and other uses.

Despite being immensely powerful tools for biomedical, chemical, and materials science applications, conventional nuclear magnetic resonance spectroscopy (NMR) and magnetic resonance imaging (MM) methods are limited by inherently low sensitivity [Ernst, 1992; Nikolaou et al., 2015; Ardenkjaer-Larsen et al., 2015; Barskiy et al., 2017 (Chem Eur J)]. This limitation can be overcome via hyperpolarization techniques, which allow orders of magnitude NMR/MRI signal enhancement. The most widely used hyperpolarization techniques employ polarization transfer from electrons (dynamic nuclear polarization) [Ardenkjaer-Larsen et al., 2003], photons (spin exchange optical pumping) [Goodson, 2002], or para-hydrogen (para-hydrogen-induced polarization, PHIP) [Bower and Weitekamp, 1987; Natterer and Bargon, 1997]. The latter approach is particularly attractive: PHIP and its recent variant SABRE (signal amplification by reversible exchange) [Adams et al., 2009; Mewis et al., 2015] allow transfer of the 100% pure singlet spin order of para-hydrogen (para-$H_2$) to a variety of nuclei ($^{13}C$, $^{15}N$, $^{19}F$, $^{31}P$, etc.) [Barskiy et al., 2017 (ChemPhysChem); Theis et al., 2015; Shchepin et al., 2017 (ChemPhysChem); Zhivonitko et al., 2015] in a wide range of molecular motifs, including metabolically relevant carboxylic compounds [Reineri et al., 2015; Shchepin et al., 2016 (Angew Chem Int Ed); Cavallari et al., 2017], antibiotics [Barskiy et al., 2016 (J Am Chem Soc), Schiff bases [Logan et al., 2016], and bioorthogonal molecular tags [Bae e al., 2018]. High polarization percentage, short signal build-up times, low cost, and scalability make PHIP and SABRE promising modalities for studying metabolism in vivo by magnetic resonance techniques [Hovener et al., 2018].

Figure 17:
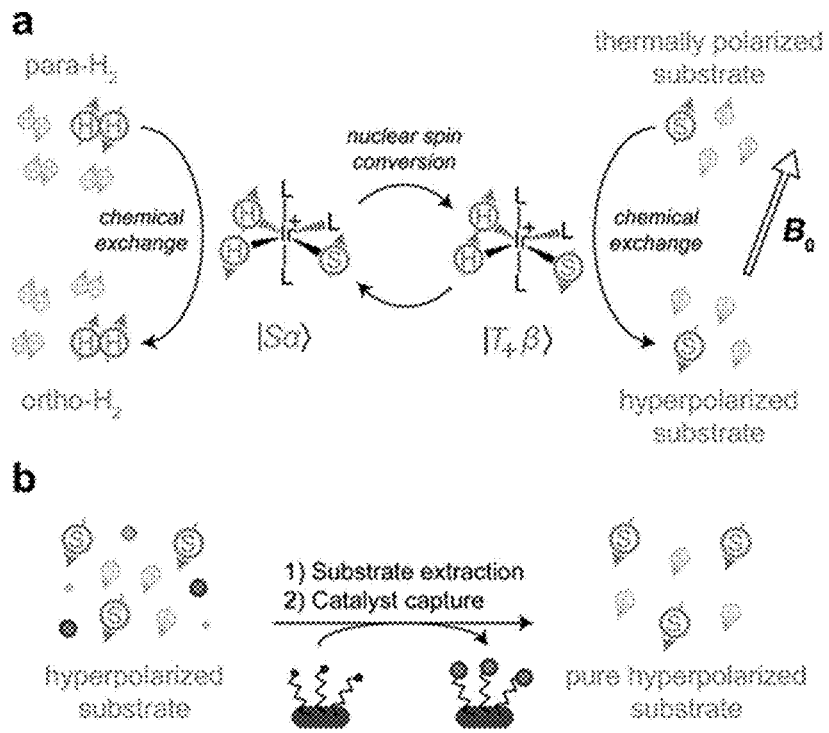
FIG. 17. (a) Schematic diagram of the SABRE process. A coherent polarization transfer is carried out between singlet ($|S\rangle$) and triplet ($|T+\rangle$) spin states of para-$H_2$-derived hydrides and the spin state ($|S\rangle$ or $|T+\rangle$) of a substrate (S). (b) After polarization buildup in the organic phase, a hyperpolarized contrast agent is extracted to an aqueous medium, and the residual metal complex is rapidly captured by a scavenging agent.

Currently, the main obstacle to para-$H_2$-based polarization techniques in biomedicine is the presence of heavy metal-based complexes (referred to below as catalysts) in solution with hyperpolarized contrast agents. These catalysts are typically Rh-based (PHIP) and Ir-based (SABRE) metal-organic compounds, and they "catalyze" the polarization transfer of spin order from para-$H_2$ to the substrate (FIG. 17A). Their presence in solution is necessary to provide polarization transfer from para-$H_2$ to the substrate [Barskiy et al., 2016 (Phys Chem Chem Phys)]; however, their administration in vivo should be avoided. Despite efforts to synthesize heterogeneous (HET) PHIP/SABRE catalysts [Kovtunov et al., 2008; Kovtunov et al., 2013; Zhao et al., 2015; Shi et al., 2014]—typically in the form of solid particles facilitating hyperpolarization of liquids and gases mixed with para-$H_2$—no discovery has been reported of high (>5%) polarization of biologically relevant molecules, a threshold for biomedical applications [Golman and Petersson, 2006].

A two-step method as demonstrated herein, involving phase extraction and catalyst capture, can effectively and rapidly separate heavy metal-based polarization transfer catalysts from the biologically relevant hyperpolarized substrates of interest (FIG. 17B). This technique, on the time scale of seconds, produces para-$H_2$-based hyperpolarized contrast agents that are effectively isolated from metal complexes (i.e., the metal concentration is less than 1 ppb), as shown by analysis from high-resolution NMR and inductively coupled plasma atomic emission spectroscopy (ICP-AES).

In the present study, SABRE hyperpolarization technique and the most efficient to date polarization transfer catalyst, [Ir(IMes)$H_2S_3$]Cl (1), obtained via activation of the established Ir catalyst precursor 2 [Ir(COD)(IMes)Cl] (IMes=1, 3-bis(2,4,6-trimethyl-phenyl)imidazol-2-ylidene; COD=cyclooctadiene) [Cowley et al., 2011] are used. $^{15}N$-labeled pyridine (98% $^{15}N$, Sigma-Aldrich 486183) was used as a substrate (S). Detailed experimental procedures of the catalyst solution preparation and activation are further described below.

Figure 19:
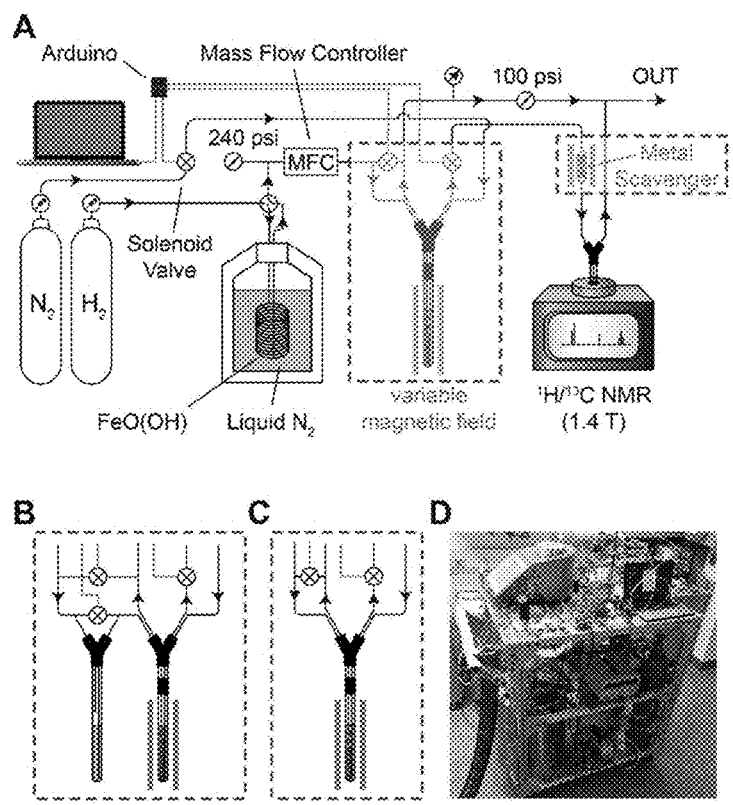
FIG. 19. A) Diagram of the automated polarizer employed to perform SABRE hyperpolarization and aqueous phase extraction of a hyperpolarized compound and a metal catalyst capture. Black lines indicate gas flow path, red lines indicate electronic signal path. B) Modification of the setup depicted in (A) for carrying out rapid extraction experiments. A tube filled with DI water is depicted on the left. By closing the corresponding valve, water is pushed to a polarization chamber where rapid extraction is performed. C) Modification of the setup depicted in (A) for carrying out rapid catalyst capture experiments. A metal scavenger is located in a small tube near the entrance to the NMR tube located in the NMR spectrometer. D) Photograph of the automated polarizer employed to perform SABRE hyperpolarization and extraction/capture experiments.

For extraction experiments, the SABRE hyperpolarization technique was used with pyridine, the most studied SABRE substrate [Adams et al., 2009]. A homemade, automatically controlled polarizer executed the activation and transfer steps of the extraction method (FIG. 19). After hyperpolarization buildup via para-$H_2$ bubbling in the organic phase, pyridine can be efficiently transferred to the aqueous phase, while 99.0-99.9% of the catalyst complex 1 remains in the organic phase; these results are verified by $^1H$ NMR and ICP-AES data (see TABLE 7 below). This observation verifies recent findings [Iali et al., 2017] indicating that most of the SABRE catalyst tends to remain in the organic phase during the extraction process. However, there is still a measurable amount of catalyst in the aqueous phase solution (1-10 µM), constraining the direct applications of this approach to biomedicine [Reineri et al., 2011]. While iridium complexes are generally considered to be "slightly toxic" (i.e., $LD_{50}$ dosage is 500-5000 ppb) [Egorova and Ananikov, 2017], cytotoxicity studies performed with an activated SABRE reaction mixture showed a reduction in cell viability due to the presence of 1 [Manoharan et al., 2018]. One should note that the detectable presence of iridium in the aqueous phase after extraction is not surprising because studies of Truong et al. conclusively demonstrated water solubility of 1 after activation in methanol (while 2 is not soluble in water) [Truong et al., 2014]. Therefore, despite the fact that the extraction process allows removal of the main portion of the metal complex, additional filtration steps are necessary to achieve full biocompatibility.

Figure 18:
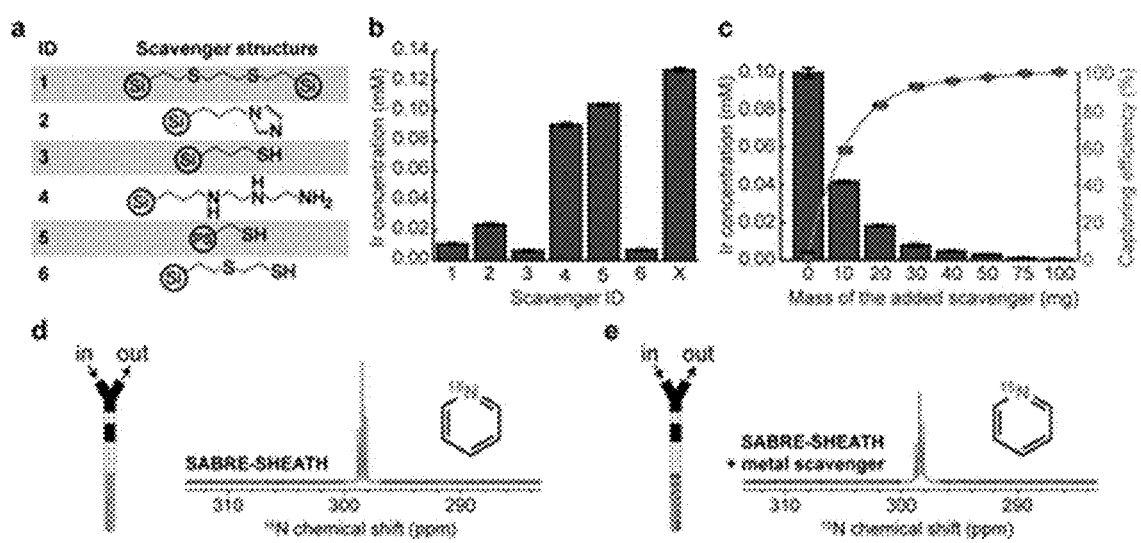
FIG. 18. (a) Chemical structures of metal scavengers used in the SABRE catalyst capturing studies. (b) Concentration of Ir detected by ICP-AES after overnight storage of a 0.5 mL aqueous solution of 1 in the presence of different metal scavengers (10 mg). Scavengers' identification (ID) numbers are listed in (a); "X" indicates that no scavenger was added. (c) Concentration of Ir detected by ICP-AES after rapid capture (<10 s) of 1 from the 0.5 mL aqueous solution by different amounts of the added metal scavenger (ID #3). The metal capturing efficiency is shown on the right. (d)$^{15}$N NMR spectrum of pyridine-$^{15}$N hyperpolarized via SABRE-SHEATH [Theis et al., 2015] (pyridine-$^{15}$N, 100 mM; Ir catalyst, 7.8 mM; 0.6 mL of $CD_3OD$). (e)$^{15}$N NMR spectrum of pyridine-$^{15}$N hyperpolarized via SABRE-SHEATH [Theis et al., 2015]; 21 mg of the metal scavenger #3 is added to the same solution as that in (d).

In order to prepare metal-free aqueous solutions containing hyperpolarized tracers, we propose a new catalyst capture technique. This technique involves the use of metal scavenging agents to completely eliminate metal quantities from aqueous solutions. Multiple metal scavenging agents' affinity for 1 were tested (FIG. 18A). Remarkably, the commercially available mercaptopropyl silica (QuadraSil MP, Sigma-Aldrich 679526) and 2-mercaptoethyl ethyl sulfide silica (Sigma-Aldrich 745111) were shown to capture 1 most effectively (FIG. 18B). The mercaptopropyl silica, however, showed better performance in capturing the Ir complex on a short time scale (under 10 s), shown below. This result is critical because hyperpolarized compounds must be cleared from the polarization transfer catalyst as quickly as possible to preserve high nuclear spin polarization after the capturing process. Llifetimes of several tens of minutes for $^{15}N$ hyperpolarized tracers have been successfully demonstrated Theis et al., 2016].

Interestingly, despite some scavengers having similar functionality (FIG. 18A), they perform quite differently (FIG. 18B). Nitrogen-containing scavengers (#2 and #4) show generally poorer performance compared to sulfur-containing scavengers (#1, #3, and #6). However, the most striking difference is observed between somewhat similar scavengers #3 and #5. This difference can be attributed to the short hydrocarbon chain and different support structure (polystyrene) of #5, which sterically hinder interaction of the bulky complex 1 with —SH groups.

The ability of mercaptopropyl silica (scavenger #3) to rapidly capture the Ir complex from the aqueous solution was tested (FIG. 18C). Treating 0.5 mL of the aqueous solution of 1 with only 10 mg of mercaptopropyl silica for less than 10 s reduces the metal amount by approximately 60% (FIG. 18C). Increasing the scavenger mass to 100 mg per 0.5 mL of solution allows complete capture of the Ir complex from solution (the measured Ir concentration is 0.3±0.3 ppb, less than the ICP-AES detection sensitivity). This efficient capturing ability is due to the significant concentration of surface thiol groups relative to the concentration of Ir in solution. Indeed, the surface —SH concentration is 1.0-1.5 mmol/g, while the amount of 1 in the studied solutions (0.5 mL) was only 2.0-3.0 µmol. Given the scavenger loading, this corresponds to a two orders of magnitude scavenger excess compared to the metal complex, a prerequisite for efficient and rapid metal capture.

In order to demonstrate that hyperpolarization can survive the catalyst capture process, additional measurements were performed. Unfortunately, due to experimental limitations and the absence of the $^{15}N$ detection capabilities on the benchtop NMR spectrometer, it was not possible to perform automated catalyst capture using the setup described in FIG. 19. However, $^{15}N$ NMR measurements carried out with 100 mM pyridine-$^{15}N$ solution in methanol-$d_4$ at 9.4 T with 21 mg of the added mercaptopropyl silica confirmed that the scavenger does not noticeably affect the hyperpolarization level and its lifetime. Indeed, FIG. 18D, E shows that the $^{15}N$ NMR signal of pyridine-$^{15}N$ is only decreased slightly (by ~20%) due to the presence of the scavenger. This decrease can be attributed to the catalyst capture process rather than to accelerated $^{15}N$ relaxation induced by the presence of the scavenger. When the capturing process is complete, attempts to polarize the solution again do not lead to $^{15}N$ NMR signal observation, additionally confirming the efficacy of the capture process.

Figure 25:
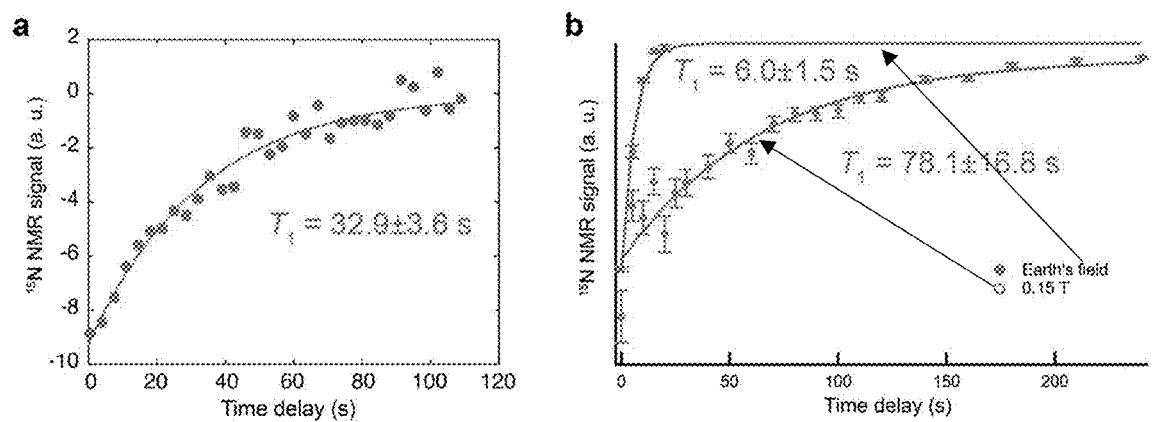
FIG. 25. a) $^{15}$N nuclear spin polarization decay measured at 9.4 T by applying small angle (10°) excitation pulses. b) $^{15}$N nuclear spin polarization decay measured at Earth's magnetic field (top line) and the field ~0.15 T (bottom line) created by a parallelepipedic NdFeB magnet (CMS Magnetics).

Interestingly, the measured $T_1$ is increased by a factor of ~10 when the hyperpolarized sample is stored at an elevated field of 0.15 T after production in the µT field compared to storage in the Earth's field (FIG. 25). This result is similar to the recent observation of the prolonged $^{15}N$ lifetime of metronidazole at ~0.3 T [Shchepin et al., 2018]. This result indicates that the final design of the para-$H_2$-based polarizer should include precise control of the magnetic field at the site where catalyst extraction and/or capture are performed.

In conclusion, a new catalyst capture technique that can be used alone or concurrently with phase extraction has been demonstrated herein. When used in conjunction with phase extraction (i.e., when the initial catalyst concentration in water is less than 0.1 mM), one can completely remove the SABRE catalyst from solution in seconds (the Ir concentration is 0.3±0.3 ppb as confirmed by ICP-AES). This result opens the path to produce metal-free aqueous boluses of hyperpolarized contrast agents for in vivo MRI detection. The presented methodology can be further upgraded by using capturing agents that allow recycling of polarization transfer catalysts. Two-step extraction and metal capture approaches can potentially enable higher polarization levels (due to higher solubility of para-$H_2$ in the organic phase), which is synergistically compatible with bioorthogonal ligation strategies and, ultimately, biomedical translations.

Automated Polarizer.

Experiments were carried out using a home-built, automatically controlled polarizer (FIG. 19). Para-$H_2$ gas was produced by passing normal H2 gas (a mixture of 25% para-$H_2$ and 75% of ortho-$H_2$, 5.0 ultra-high purity H2 gas, Praxair) [Farkas, 1935] through a spiral tube filled with FeO(OH) powder (Sigma Aldrich 371254) in a Dewar filled with liquid $N_2$. Solenoid valves controlled via an Arduino board were used to switch on and off the flow of gases ($H_2$ and $N_2$). Flowrate of the $H_2$ gas was controlled by the Mass Flow Controller (Sierra Instruments, Model C100L-DD-1-OV1-SV1-PV2-V1-S0-C0). SABRE hyperpolarization was carried out in a reaction chamber located in the electromagnet with an optimal magnetic field (e.g., ~6 mT for 1H polarization) under 100 psi and 240 sccm of para-$H_2$ flow. $N_2$ gas (5.0 ultra-high purity, Praxair) was used to push the hyperpolarized solution to an NMR tube located in the 60 MHz NMR spectrometer (Nanalysis) where detection of 1H NMR spectra of hyperpolarized solutions was performed. The polarization/extraction chamber was operated at 100 psi.

Phase Extraction Experiments.

Stock Solution Preparation.

Phase extraction samples used for ICP-AES testing were prepared from initial solution of non-activated Iridium catalyst precursor ([IrCl(COD)(IMes)] [Cowley et al., 2011], MW 640 g/mol). 7.30 mg of Iridium catalyst precursor and 50 μL of pyridine were added to a 5 mL vial with 1.14 mL of chloroform [Iali et al., 2017]. After mixing, the solution was transferred to a 10 mm NMR tube for activation (~40 mins of $H_2$ bubbling at 30 sccm at 100 psi). After activation, serial dilutions yielded 5 mM, 2 mM, 1 mM, 0.5 mM, 0.2 mM, and 0.1 mM Iridium catalyst solutions (TABLE 6). Chloroform was used as the diluent.

SABRE Activation and Hyperpolarization.

Figure 11:
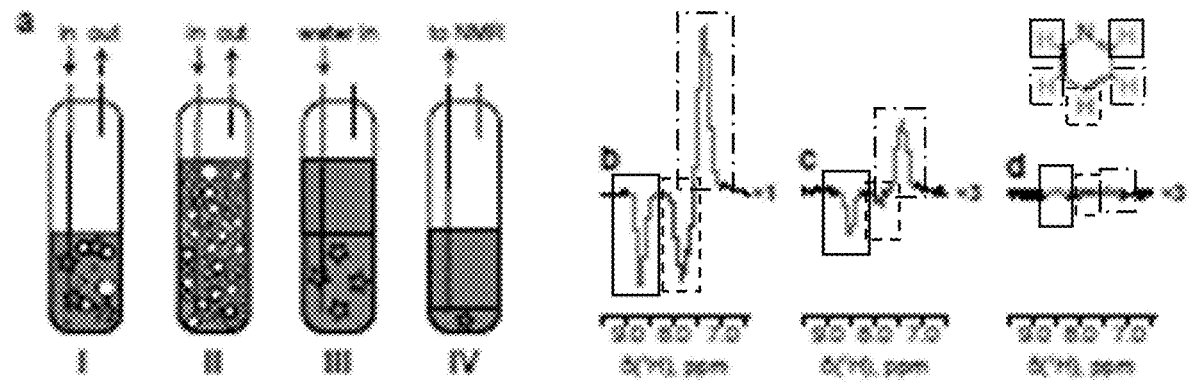
FIG. 11. a) Schematic diagram of the automated hyperpolarization/extraction process: (I) parahydrogen bubbling through the organic phase, polarization build-up; (II) aqueous phase injection, efficient mixing; (III) phase separation; (IV) aqueous phase ejection for NMR acquisition. Arrows indicate capillaries for parahydrogen/water injection/ejection and a gas outlet. Red stars represent a hyperpolarized compound. b) 1H NMR spectrum (60 MHz) of hyperpolarized pyridine in a benzene:ethanol (1:1) mixture corresponding to the process (I) depicted in (a). c) 1H NMR spectrum (60 MHz) of hyperpolarized pyridine in a water:ethanol (1:1) mixture after processes (II-IV) are completed. d) 1H NMR spectrum (60 MHz) of hyperpolarized pyridine in a water:ethanol (1:1) mixture after complete relaxation to thermal equilibrium.

For SABRE hyperpolarization, polarization build-up of the pyridine and catalyst solution in the organic phase (chloroform or benzene:ethanol mixture) was obtained by bubbling para-$H_2$ gas through the solution for 1 minute, after which an automated transfer of distilled water was added to the solution. Further bubbling of para-hydrogen gas through the mixed phase solution generated efficient mixing and separation of the organic and aqueous phases. The aqueous phase was then transferred directly to a NMR tube located in a 60 MHz benchtop NMR spectrometer (NMReady-PRO, Nanalysis) and $^1H$ NMR spectrum was detected. Results of this hyperpolarization are shown in (FIG. 11).

ICP-AES Sample Preparation and Results.

The activated Iridium catalyst and pyridine solutions were added to 5 mm NMR tubes by micropipette and 0.5 mL aliquots of distilled water were then added to the same NMR tubes. The solutions were shaken vigorously for 20 seconds to facilitate efficient mixing and extraction of the pyridine into aqueous phase. The solutions were allowed to settle and separate into distinct layers for 1 minute, aided by physical tapping on the NMR tube. With a Pasteur pipette, the aqueous phase was transferred to an Eppendorf vial, and 0.375 mL was added to a plastic test tube (15 mL centrifuge tubes, VWR International). 6 mL of 2% $HNO_3$ was added to the tube by micropipette to create the first sample (10 mM) for ICP-AES analysis. The same procedure was used to create remaining samples created 5 mM, 2 mM, 1 mM, 0.5 mM, 0.2 mM, and 0.1 mM catalyst solutions.

Figure 20:
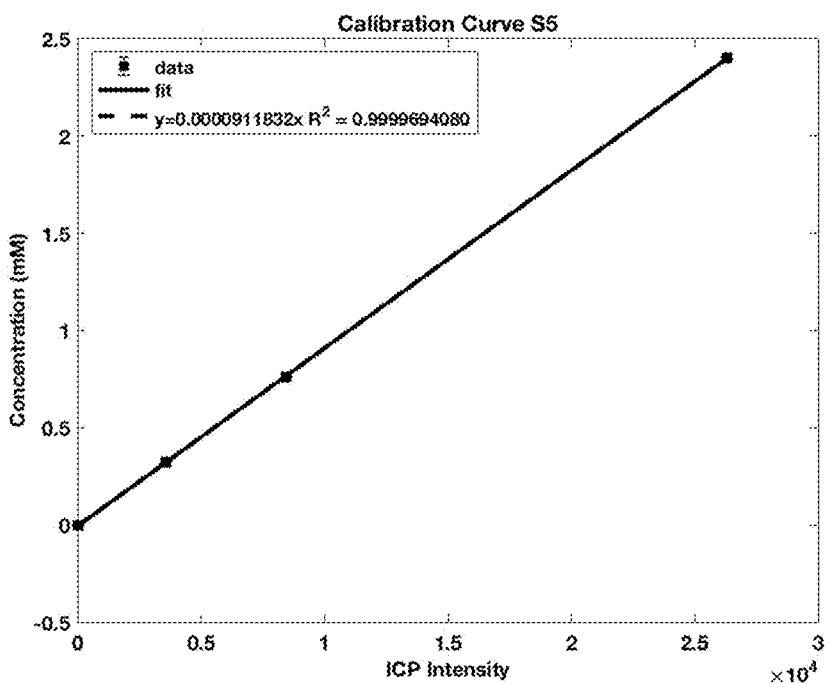
FIG. 20 is a calibration curve for sodium hexachloroiridate(IV) hexahydrate.

ICP calibration was done using sodium hexachloroiridate (IV) hexahydrate (Sigma Aldrich 209007, MW: 559.01 g/mol). Each sample then was tested by ICP-AES to obtain intensity values. The correlation between the standard (STD) solutions' concentration vs. the intensity was plotted and fitted by linear regression with y intercept set to 0 mM. TABLE 6 shows the concentration of the high, medium and low standard samples; (FIG. 20) shows the calibration curve based on the known concentrations and intensities of the ICP-AES samples. Errors are based on three separate ICP-AES measurements.

Figure 21:
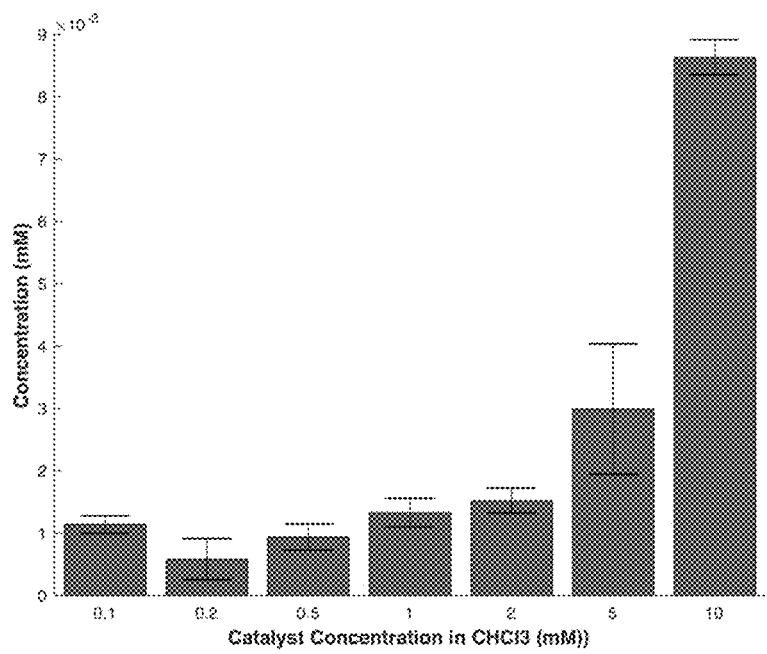
FIG. 21 is a concentration of Ir in the aqueous phase after phase extraction from $CHCl_3$.

TABLE 7 summarizes the ICP-AES signal intensities and Ir concentrations of the catalyst extraction samples, their initial concentrations, and their concentrations after phase extraction. Additionally, (FIG. 21) shows the concentration of Ir in the aqueous phase after phase extraction.

TABLE 7

Summary of ICP-AES results for Ir concentration in the aqueous phase after extraction from $CHCl_3$.

| Initial Ir Concentration in $ChCl_3$ (nM) | ICP-AES Intensity (a.u.) | Ir Concentration in Water (mM) | Ir Concentratin in Water (ppb) |
|---|---|---|---|
| 0.1 | 12.5 ± 1.5 | 0.0011 ± 0.0001 | 0.7 ± 0.1 |
| 0.2 | 6.4 ± 3.6 | 0.0006 ± 0.0003 | 0.4 ± 0.2 |
| 0.5 | 10.3 ± 2.3 | 0.0009 ± 0.0002 | 0.6 ± 0.1 |
| 1 | 14.6 ± 2.5 | 0.0013 ± 0.0002 | 0.9 ± 0.1 |
| 2 | 16.7 ± 2.2 | 0.0015 ± 0.0002 | 1.0 ± 0.1 |
| 5 | 32.8 ± 11.5 | 0.0030 ± 0.0010 | 1.9 ± 0.7 |
| 10 | 94.7 ± 3.1 | 0.0086 ± 0.0003 | 5.5 ± 0.2 |

Catalyst Capture Experiments.

Stock Solution Preparation.

Two experiments were conducted aiming to determine which scavengers capture the iridium metal complex (SABRE-catalyst) from the aqueous solution most efficiently. First, ICPAES was utilized to determine the best scavenger from 6 available scavengers (TABLE 4). Then, the performance of the best scavenger (capturing efficiency vs. mass of the added scavenger) was evaluated. Finally, the experiments were conducted to check if metal capture is possible by simply pushing the liquid through the syringe filled with the best scavenger.

In the initial experiment (Catalyst Capture A), a solution of 4.0 mM non-activated Iridium catalyst and 55 μL pyridine in 4.0 mL of methanol was used to measure the Ir capture efficiency of multiple scavengers. 10.2 mg of iridium catalyst and 55 μL of pyridine were added to a 5.0 mL vial; 4.0 mL of methanol was then added. After the solution was mixed, it was transferred to a 10 mm NMR tube by micropipette for activation.

Continued experiments (Catalyst Capture B) measured iridium catalyst capture by adding varying masses of QuadraSil MP (Sigma Aldrich 679526) to aqueous solutions, shaking for 10 seconds and separating scavengers from the solution via centrifugation. The 4.4 mM iridium catalyst initial solution contained 11.3 mg of catalyst and 100 μL of pyridine in 4.0 mL of methanol. The solution was prepared in a 5.0 mL vial and transferred to a 10 mm NMR tube by micropipette for activation.

TABLE 6

ICP-AES calibration samples using sodium hexachloroiridate(IV) hexahydrate.

| | Blank Sample | Low STD | Medium STD | High STD |
|---|---|---|---|---|
| Ir Concentration (mM) | 0.0 | 0.323 | 0.76 | 2.4 |
| ICP-AES Intensity | 1.2 ± 9.3 | 3578.9 ± 6.9 | 8434.1 ± 23.9 | 26283.8 ± 30.1 |

Catalyst Capture C experiments measured the Iridium catalyst capture efficiency using varying masses of QuadraSil MP loaded into syringes. 5 mM of non-activated iridium catalyst was prepared in 10 mL of 30:70 ethanol:water. 31.8 mg of the catalyst was first dissolved in 3 mL ethanol; sonication allowed complete dissolution of the catalyst. 7 mL of distilled water was added once the mixture was homogenous. The solution was then transferred to a 10 mm NMR tube for activation.

For all catalyst capture experiments, activation was achieved by bubbling para-H2 through each sample for 40 minutes at a flow rate of 120 sccm and a pressure of 100 psi using the homebuilt automated polarizer (FIG. 19).

ICP-AES Sample Preparation.

For Catalyst Capture A, the activated catalyst sample was transferred to a beaker. Methanol was evaporated completely from the solution by blowing steady air on top of the solution surface while submerging the beaker in a water-bath held under 60° C. The beaker was then refilled with 4.0 mL of distilled water. The solution was distributed into seven Eppendorf tubes (0.5 mL of the solution transferred into each tube). 10 mg of six different metal scavenging agents were put into each tube (TABLE 4). The control sample (vial #7) did not contain any metal scavenging agent. Each Eppendorf tube was vigorously shaken for 10 seconds and left for 12 hours. Then 0.45 mL of the liquid was transferred into a Corning Costar Spin-X centrifuge tube (Nylon membrane, pore size 0.22 μm, non-sterile) and centrifuged for 2 minutes to completely separate the QuadraSil MP microparticles from the aqueous solution. 0.375 mL of the liquid was extracted, transferred into a separate container, and diluted with 6 mL of 2% $HNO_{3(aq)}$ to give a total volume of 6.375 mL in each sample.

For Catalyst Capture B, the activated sample was transferred into a beaker, and methanol was evaporated following the same procedure as Catalyst Capture A. The beaker was refilled with 4 mL of distilled water, and the solution was divided into eight small Eppendorf tubes to give a total volume of 0.475 mL in each tube. Varying masses of QuadraSil MP were added to the first seven tubes; vial 8 had no filter added. Each Eppendorf tube was vigorously shaken for 10 seconds and then 0.45 mL of the liquid was briefly transferred into a Corning Costar Spin-X centrifuge tube and centrifuged for 2 minutes to completely separate the QuadraSil MP microparticles from the aqueous solution. 0.375 mL of the solution was transferred into a test tube (15 mL centrifuge tubes, VWR International) for ICP testing after adding an additional 6 mL of 2% $HNO_3$ (aq). The total volume for each of the eight samples was 6.375 mL.

For Catalyst Capture C, five syringes were prepared, each containing a different mass of QuadraSil MP (TABLE 8). After the catalyst solution was activated, either 0.5 mL or 1.0 mL of solution was pushed through each syringe filled with QuadraSil MP. 0.5 mL of each filtrate was transferred to a nylon Eppendorf tube and centrifuged for 2.5±0.5 minutes. Using a micropipette, 0.375 mL of each filtrate and 6 mL of 2% $HNO_3$ were added to each corresponding test tube to create samples D1-D5 (TABLE 8). Sample DX was not pushed through a syringe filled with metal scavenger; it is simply 0.375 mL of activated catalyst solution with 6 mL of $HNO_3$.

TABLE 8

Masses of QuadraSil MP for Catalyst Capture C experiments

| Sample | Mass of the Scavenger in Syringe (mg) | Volume of the Ir Catalyst Solution Pushed through Syringe (mL) |
| --- | --- | --- |
| D1 | 33 | 0.5 |
| D2 | 96 | 0.5 |
| D3 | 159 | 1.0 |
| D4 | 230 | 1.0 |
| D5 | 327 | 1.0 |
| DX | 0 | — |

ICP-AES Results.

ICP calibration was done using sodium hexachloroiridate (IV) hexahydrate (Sigma Aldrich 209007, MW: 559.01 g/mol). Each sample then was tested by ICP-AES to obtain intensity value.

Figure 22:
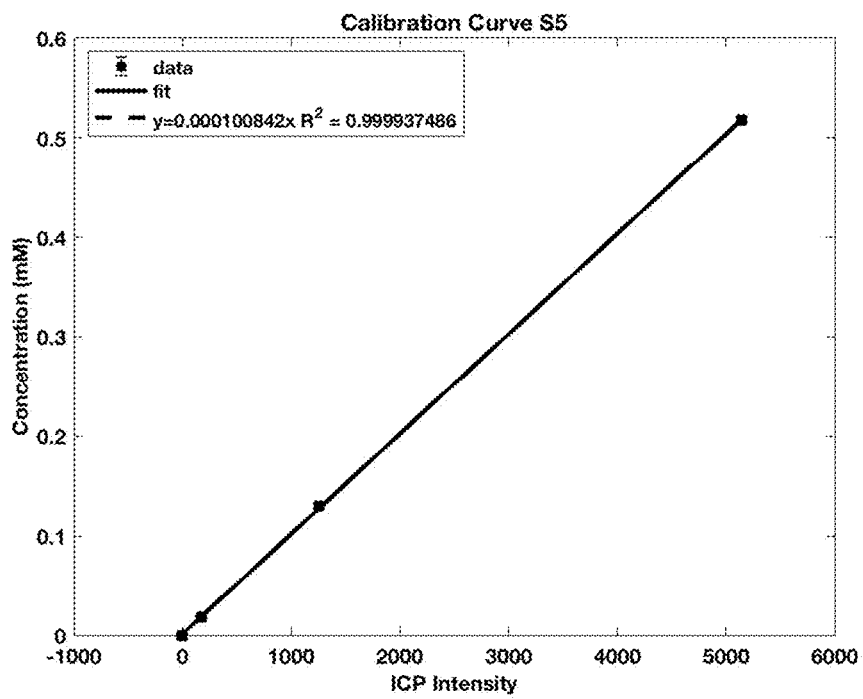
FIG. 22 is a calibration curve for sodium hexachloroiridate(IV) hexahydrate prepared for the catalyst capture experiments.
Figure 23:
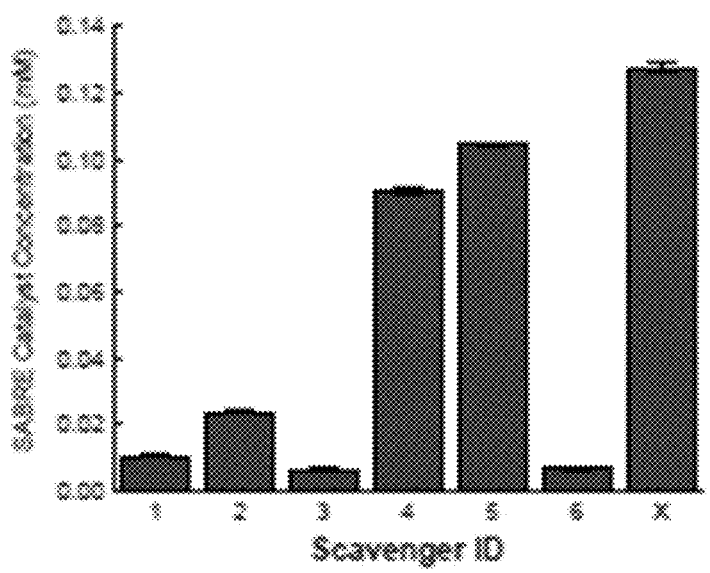
FIG. 23 shows a comparison of the metal scavengers' efficiency in the Catalyst Capture A experiments. Scavengers' identification (ID) numbers are listed in FIG. 18A. "X" indicates that no scavenger was added.
Figure 24:
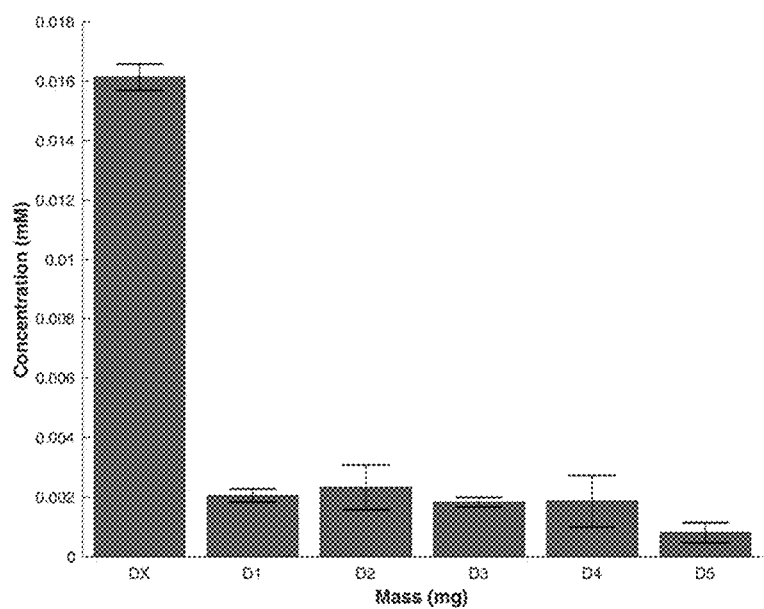
FIG. 24 shows concentration of Iridium in solution, measured by ICP-AES after pushing the solutions through syringes filled with QuadraSil MP metal scavengers (TABLE 11, Catalyst Capture C experiments).

ICP-AES results for the Catalyst Capture A and Catalyst Capture B experiments are presented in FIG. 18B, C (discussed above). TABLE 9 shows calibration samples for the catalyst capture experiments, while (FIG. 22) illustrates the associated calibration curve. TABLE 10 depicts results for various metal scavenging agents, and (FIG. 23) shows a comparison of scavenger efficiency. Results from Catalyst Capture B experiments are shown in TABLE 11, and results from Catalyst Capture C experiments are shown in TABLE 12. Further results from the syringes used in capture experiments are shown in (FIG. 24) and (FIG. 15).

TABLE 9

ICP-AES calibration samples using sodium hexachloroiridate(IV) hexahydrate prepared for the catalyst capture experiments.

|  | Blank Sample | Low STD | Medium STD | High STD |
| --- | --- | --- | --- | --- |
| Concentration (mM) | 0.0 | 0.0185 | 0.13 | 0.518 |
| Intensity | −0.36 ± 4.62 | 169.9 ± 4.4 | 1260.5 ± 5.7 | 5114.2 ± 26.3 |

TABLE 10

ICP-AES results for different metal scavenging agents.

| Scavenger ID (same as in FIG. 18A) | ICP-AES Intensity (a.u.) | Ir Concentration (mM) | Ir Concentration (ppb) |
| --- | --- | --- | --- |
| 1 | 106.5 ± 6.8 | 0.01074 ± 0.00070 | 6.87 ± 0.45 |
| 2 | 237.2 ± 14.1 | 0.02392 ± 0.00086 | 15.31 ± 0.55 |
| 3 | 63.2 ± 3.4 | 0.00637 ± 0.00061 | 4.08 ± 0.39 |
| 4 | 901.3 ± 51.5 | 0.09089 ± 0.00121 | 58.17 ± 0.78 |
| 5 | 1037.3 ± 63.1 | 0.10460 ± 0.00065 | 66.94 ± 0.42 |
| 6 | 69.1 ± 4.7 | 0.00697 ± 0.00062 | 4.46 ± 0.40 |
| No Filter | 1265.4 ± 72.0 | 0.12762 ± 0.00133 | 81.67 ± 0.85 |

TABLE 11

ICP-AES results for Catalyst Capture B experiments (same as FIG. 18C).

| Mass of Added Scavenger (mg) | Measured ICP-AES Intensity (a.u.) | Ir Concentration (mM) | Catalyst Capture Efficiency (%) | Ir Concentration (ppb) |
|---|---|---|---|---|
| 0    | 1029.6 ± 26.6 | 0.0996 ± 0.0026 | 0.0 ± 3.7  | 63.7 ± 1.6 |
| 10   | 432.1 ± 4.2   | 0.0418 ± 0.0004 | 58.0 ± 1.2 | 26.8 ± 0.3 |
| 20   | 187.8 ± 7.0   | 0.0182 ± 0.0007 | 81.8 ± 0.8 | 11.6 ± 0.4 |
| 30   | 80.7 ± 8.4    | 0.0078 ± 0.0008 | 92.2 ± 0.8 | 5.0 ± 0.5  |
| 40   | 48.5 ± 4.4    | 0.0047 ± 0.0004 | 95.3 ± 0.4 | 3.0 ± 0.3  |
| 50   | 32.2 ± 2.1    | 0.0031 ± 0.0002 | 96.9 ± 0.2 | 2.0 ± 0.1  |
| 75   | 9.7 ± 5.0     | 0.0009 ± 0.0005 | 99.1 ± 0.5 | 0.6 ± 0.3  |
| 1000 | 4.4 ± 4.0     | 0.0004 ± 0.0005 | 99.6 ± 0.4 | 0.3 ± 0.3  |

TABLE 12

ICP-AES results for Catalyst Capture C experiments.

| Sample ID | Intensity in ICP-AES | Ir Concentration (mM) | Ir Concentration (ppb) |
|---|---|---|---|
| DX | 177 ± 4.9  | 0.0161 ± 0.0004 | 10.4 ± 0.3 |
| D1 | 22.5 ± 2.5 | 0.0021 ± 0.0002 | 1.3 ± 0.1  |
| D2 | 25.6 ± 8.2 | 0.0023 ± 0.0007 | 1.5 ± 0.5  |
| D3 | 20.1 ± 1.8 | 0.0018 ± 0.0002 | 1.2 ± 0.1  |
| D4 | 20.5 ± 9.5 | 0.0019 ± 0.0009 | 1.2 ± 0.6  |
| D5 | 8.8 ± 3.7  | 0.0008 ± 0.0003 | 0.5 ± 0.2  |

$^1$H and $^{15}$N Hyperpolarization Experiments.
Stock Solution Preparation.

For $^{15}$N hyperpolarization experiments, the sample was prepared with 100 mM of $^{15}$N labeled pyridine as the target substrate. This sample contained 3 mg of non-activated iridium catalyst ([IrCl(COD)(IMes)]), lending a final concentration of 7.8 mM of the activated catalyst in methanol-d4. The sample was activated by bubbling parahydrogen at 30 sccm for ~40 min under ~7 atm hydrogen; flow rate was controlled by the mass flow controller (Sierra Instruments, Monterey, Calif.).

The $^{15}$N-SABRE-SHEATH hyperpolarization procedure was conducted similarly to that described earlier [Barskiy et al., 2016 (J Am Chem Soc)]. The sample solution was bubbled with parahydrogen (~50% para-fraction) at 120 sccm under ~7 atm inside the magnetic shield for a period of 1 min. The additional μT magnetic field was created using a custom-built solenoid coil and a power supply. After stopping parahydrogen bubbling the sample was quickly transferred from the shield to the Earth's magnetic field followed by sample insertion and acquisition of the $^{15}$N NMR spectrum via a 400 MHz Varian VNMRS console and 10 mm dual-channel broadband liquids probe (FIG. 18D). Addition of 21 mg of the metal scavenger QuadraSil MP (Sigma Aldrich 679526) to the sample resulted in the decrease of the $^{15}$N NMR signal of pyridine-$^{15}$N (FIG. 18E).

15N NMR Relaxation Measurements.

Nuclear spin polarization decay measurements are described above and illustrated in FIG. 25.

REFERENCES

The following documents are referred to in the Description.

Adams, R. W.; Aguilar, J. A.; Atkinson, K. D.; Cowley, M. J.; Elliott, P. I. P.; Duckett, S. B.; Green, G. G. R.; Khazal, I. G.; Lopez-Serrano, J.; Williamson, D. C. Reversible Interactions With Para-Hydrogen Enhance NMR Sensitivity by Polarization Transfer. Science 2009, 323, 1708-1711.

Adams, R. W.; Duckett, S. B.; Green, R. A.; Williamson, D. C.; Green, G. G. R. A Theoretical Basis for Spontaneous Polarization Transfer in Non-Hydrogenative Parahydrogen-Induced Polarization. J. Chem. Phys. 2009, 131, 194505.

Appleby, K. M.; Mewis, R. E.; Olaru, A. M.; Green, G. G. R.; Fairlamb, I. J. S.; Duckett, S. B. Investigating pyridazine and phthalazine exchange in a series of iridium complexes in order to define their role in the catalytic transfer of magnetisation from para-hydrogen. Chemical Science 2015, 6 (7), 3981-3993.

Ardenkjaer-Larsen, J. H.; Fridlund, B.; Gram, A.; Hansson, G.; Hansson, L.; Lerche, M. H.; Servin, R.; Thaning, M.; Golman, K. Increase in Signal-to-Noise Ratio of >10 000 Times in Liquid-State NMR. Proc. Natl. Acad. Sci. U.S.A. 2003, 100, 10158-10163.

Ardenkjaer-Larsen, J.; Boebinger, G.; Comment, A.; Duckett, S.; Edison, A.; Engelke, F.; Griesinger, C.; Griffin, R.; Hilty, C.; Maeda, H.; Parigi, G.; Prisner, T.; Ravera, E.; van Bentum, J.; Vega, S.; Webb, A.; Luchinat, C.; Schwalbe, H.; Frydman, L. Facing and Overcoming Sensitivity Challenges in Biomolecular NMR Spectroscopy. Angew. Chem., Int. Ed. 2015, 54, 9162-9185.

Ardenkjaer-Larsen, J. H. On the Present and Future of Dissolution-DNP. J. Magn. Reson. 2016, 264, 3-12.

Bae, J.; Zhou, Z.; Theis, T.; Warren, W. S.; Wang, Q. 15N4-1,2,4,5-tetrazines as potential molecular tags: Integrating bioorthogonal chemistry with hyperpolarization and unearthing para-N2. Sci. Adv. 2018, 4, eaar2978.

Bales, L.; Kovtunov, K. V.; Barskiy, D. A.; Shchepin, R. V.; Coffey, A. M.; Kovtunova, L. M.; Bukhtiyarov, A. V.; Feldman, M. A.; Bukhtiyarov, V. I.; Chekmenev, E. Y.; Koptyug, I. V.; Goodson, B. M. Aqueous, Heterogeneous Parahydrogen-Induced 15N Polarization. The Journal of Physical Chemistry C 2017, 121 (28), 15304-15309.

Barskiy, D. A.; Shchepin, R. V.; Coffey, A. M.; Theis, T.; Warren, W. S.; Goodson, B. M.; Chekmenev, E. Y. Over 20% 15N Hyperpolarization in Under One Minute for Metronidazole, an Antibiotic and Hypoxia Probe. J. Am. Chem. Soc. 2016, 138, 8080-8083.

Barskiy, D.; Pravdivtsev, A.; Ivanov, K.; Kovtunov, K.; Koptyug, I. A Simple Analytical Model for Signal Amplification by Reversible Exchange (SABRE) Process. Phys. Chem. Chem. Phys. 2016, 18, 89-93.

Barskiy, D. A.; Shchepin, R. V.; Tanner, C. P. N.; Colell, J. F. P.; Goodson, B. M.; Theis, T.; Warren, W. S.; Chekmenev, E. Y. The Absence of Quadrupolar Nuclei Facilitates Efficient 13C Hyperpolarization via Reversible Exchange with Parahydrogen. ChemPhysChem 2017, 18, 1493-1498.

Barskiy, D. A.; Coffey, A. M.; Nikolaou, P.; Mikhaylov, D. M.; Goodson, B. M.; Branca, R. T.; Lu, G. J.; Shapiro, M. G.; Telkki, V. V.; Zhivonitko, V. V.; Koptyug, I. V.; Salnikov, O. G.; Kovtunov, K. V.; Bukhtiyarov, V. I.; Rosen, M. S.; Barlow, M. J.; Safavi, S.; Hall, I. P.; Schroder, L.; Chekmenev, E. Y. NMR Hyperpolarization Techniques of Gases. Chem.—Eur. J. 2017, 23, 725-751.

Bowers, C. R.; Weitekamp, D. P. Para-Hydrogen and Synthesis Allow Dramatically Enhanced Nuclear Alignment. J. Am. Chem. Soc. 1987, 109, 5541-5542.

Bowers, C. R. Sensitivity Enhancement Utilizing Parahydrogen. In eMagRes; John Wiley & Sons, Ltd, 2007.

17. Cavallari, E.; Carrera, C.; Aime, S.; Reineri, F. 13C MR Hyperpolarization of Lactate by Using ParaHydrogen and Metabolic Transformation in Vitro. Chem.—Eur. J. 2017, 23, 1200-1204.

E. Cavallari, C. Carrera, S. Aime, F. Reineri. Studies to enhance the hyperpolarization level in PHIP-SAH-produced C13-pyruvate. J. Magn. Reson., 2018, 289, 12-17.

Colell, J. F. P.; Logan, A. W. J.; Zhou, Z.; Shchepin, R. V.; Barskiy, D. A.; Ortiz, G. X.; Wang, Q.; Malcolmson, S. J.; Chekmenev, E. Y.; Warren, W. S. Generalizing, Extending, and Maximizing Nitrogen-15 Hyperpolarization Induced by Parahydrogen in Reversible Exchange. J. Phys. Chem. C 2017, 121, 6626-6634.

Comment, A. Dissolution DNP for In Vivo Preclinical Studies. J. Magn. Reson. 2016, 264, 39-48.

Cowley, M. J.; Adams, R. W.; Atkinson, K. D.; Cockett, M. C. R.; Duckett, S. B.; Green, G. G. R.; Lohman, J. A. B.; Kerssebaum, R.; Kilgour, D.; Mewis, R. E. Iridium N-Heterocyclic Carbene Complexes as Efficient Catalysts for Magnetization Transfer from Para-Hydrogen. J. Am. Chem. Soc. 2011, 133, 6134-6137.

Duckett, S. B.; Mewis, R. E. Application of Parahydrogen Induced Polarization Techniques in NMR Spectroscopy and Imaging. Acc. Chem. Res. 2012, 45, 1247-1257.

Peter J. Dunn, K. K. (Mimi) Hii, Michael J. Krische, and Michael T. Williams, eds. Sustainable Catalysis: Challenges and Practice for the Pharmaceutical and Fine Chemical Industries (Wiley: Hoboken, 2013) § 8.7.

Egorova, K. S.; Ananikov, V. P. Toxicity of Metal Compounds: Knowledge and Myths. Organometallics 2017, 36, 4071-4090.

Erickson, S. H.; Oppenheim, G. L.; Smith, G. H. Metronidazole in Breast Milk. Obstet. Gynecol. 1981, 57, 48-50.

Ernst, R. Nuclear Magnetic Resonance Fourier-Transform Spectroscopy (Nobel Lecture). Angew. Chem., Int. Ed. Engl. 1992, 31, 805-823.

Farkas, A. Orthohydrogen, Parahydrogen, and Heavy Hydrogen; Cambridge University Press: Cambridge, U.K.; 1935.

Feng, B.; Coffey, A. M.; Colon, R. D.; Chekmenev, E. Y.; Waddell, K. W. A Pulsed Injection Parahydrogen Generator and Techniques for Quantifying Enrichment. J. Magn. Reson. 2012, 214, 258-262.

Fleming, I. N.; Manavaki, R.; Blower, P. J.; West, C.; Williams, K. J.; Harris, A. L.; Domarkas, J.; Lord, S.; Baldry, C.; Gilbert, F. J. Imaging Tumour Hypoxia With Positron Emission Tomography. Br. J. Cancer 2015, 112, 238-250.

Golman, K.; Petersson, J. Metabolic imaging and other applications of hyperpolarized C-13. Acad. Radiol. 2006, 13, 932-942.

Goodson, B. M. Nuclear Magnetic Resonance of Laser-Polarized Noble Gases in Molecules, Materials, and Organisms. J. Magn. Reson. 2002, 155, 157-216.

Goodson, B. M.; Whiting, N.; Coffey, A. M.; Nikolaou, P.; Shi, F.; Gust, B. M.; Gemeinhardt, M. E.; Shchepin, R. V.; Skinner, J. G.; Birchall, J. R. Hyperpolarization Methods for Mrs. Emagres 2015, 4, 797-810.

Hovener, J.; Pravdivtsev, A. N.; Kidd, B.; Bowers, C. R.; Gloggler, S.; Kovtunov, K. V.; Plaumann, M.; Katz-Brull, R.; Buckenmaier, K.; Jerschow, A.; Reinert, F.; Theis, T.; Shchepin, R. V.; Wagner, S.; Zacharias, N. M. M.; Bhattacharya, P.; Chekmenev, E. Y. Parahydrogen-based Hyperpolarization for Biomedicine. Angew. Chem., Int. Ed. 2018, 57((35), 11140-11162.

Iali, W.; Olaru, A.; Green, G.; Duckett, S. Achieving High Levels of NMR-Hyperpolarization in Aqueous Media With Minimal Catalyst Contamination Using SABRE. Chem.—Eur. J. 2017, 23, 10491-10495.

Kidd, B. E.; Mashni, J. A.; Limbach, M. N.; Shi, F.; Chekmenev, E. Y.; Hou, Y.; Goodson, B. M. Toward Cleavable Metabolic/pH Sensing "Double Agents" Hyperpolarized via NMR Signal Amplification by Reversible Exchange. Chem.—Eur. J. 2018, 24(42), 10641-10645.

Kizaka-Kondoh, S.; Konse-Nagasawa, H. Significance of Nitroimidazole Compounds and Hypoxia-Inducible Factor-1 for Imaging Tumor Hypoxia. Cancer Sci. 2009, 100, 1366-1373.

Komar, G.; Seppanen, M.; Eskola, O.; Lindholm, P.; Gronroos, T. J.; Forsback, S.; Sipila, H.; Evans, S. M.; Solin, O.; Minn, H. 18F-EFS: A New PET Tracer for Imaging Hypoxia in Head and Neck Cancer. J. Nucl. Med. 2008, 49, 1944-1951.

I. Koptyug, K. Kovtunov, S. Burt, M. Anwar, C. Hilty, S-I Han, A. Pines, R. Sagdeev. para-Hydrogen-induced polarization in heterogeneous hydrogenation reactions. J. Am. Chem. Soc., 2007, 129 (17), 5580-5586.

Kovtunov, K. V.; Beck, I. E.; Bukhtiyarov, V. I.; Koptyug, I. V. Observation of Parahydrogen-Induced Polarization in Heterogeneous Hydrogenation on Supported Metal Catalysts. Angew. Chem., Int. Ed. 2008, 47, 1492-1495.

Kovtunov, K.; Zhivonitko, V.; Skovpin, I.; Barskiy, D.; Koptyug, I. Parahydrogen-Induced Polarization in Heterogeneous Catalytic Processes. Top. Curr. Chem. 2013, 338, 123-180.

Kovtunov, K. V.; Kovtunova, L. M.; Gemeinhardt, M. E.; Bukhtiyarov, A. V.; Gesiorski, J.; Bukhtiyarov, V. I.; Chekmenev, E. Y.; Koptyug, I. V.; Goodson, B. M. Heterogeneous Microtesla SABRE Enhancement of 15N NMR Signals. Angew. Chem., Int. Ed. 2017, 56, 10433-10437.

Kovtunov, K. V.; Pokochueva, E.; Salnikov, O.; Cousin, S.; Kurzbach, D.; Vuichoud, B.; Jannin, S.; Chekmenev, E.; Goodson, B.; Barskiy, D. Hyperpolarized NMR spectroscopy: d-DNP, PHIP, and SABRE. Chem. Asian J. 2018, 13(15), 1857-1871.

Kurhanewicz, J.; Vigneron, D. B.; Brindle, K.; Chekmenev, E. Y.; Comment, A.; Cunningham, C. H.; DeBerardinis, R. J.; Green, G. G.; Leach, M. O.; Raj an, S. S. Analysis of Cancer Metabolism by Imaging Hyperpolarized Nuclei: Prospects for Translation to Clinical Research. Neoplasia 2011, 13, 81-97.

Lee, J. H.; Okuno, Y.; Cavagnero, S. Sensitivity Enhancement in Solution NMR: Emerging Ideas and New Frontiers. J. Magn. Reson. 2014, 241, 18-31.

Logan, A. W. J.; Theis, T.; Colell, J. F. P.; Warren, W. S.; Malcolmson, S. J. Hyperpolarization of Nitrogen-15 Schiff Bases by Reversible Exchange Catalysis with para-Hydrogen. Chem.—Eur. J. 2016, 22, 10777-10781.

Manoharan, A.; Rayner, P.; Iali, W.; Burns, M.; Perry, V.; Duckett, S. Achieving Biocompatible SABRE: An in vitro Cytotoxicity Study. ChemMedChem 2018, 13, 352-359.

Masaki, Y.; Shimizu, Y.; Yoshioka, T.; Tanaka, Y.; Nishijima, K.; Zhao, S.; Higashino, K.; Sakamoto, S.; Numata, Y.; Yamaguchi, Y. The Accumulation Mechanism of the Hypoxia Imaging Probe "FMISO" by Imaging Mass Spectrometry: Possible Involvement of Low-Molecular Metabolites. Sci. Rep. 2015, 5, 16802.

Mewis, R. E.; Fekete, M.; Green, G. G. R.; Whitwood, A. C.; Duckett, S. B. Deactivation of Signal Amplification by Reversible Exchange Catalysis, Progress Towards In Vivo Application. Chem. Commun.2015, 51, 9857-9859.

Natterer, J.; Bargon, J. Parahydrogen Induced Polarization. Prog. Nucl. Magn. Reson. Spectrosc. 1997, 31, 293-315.

Nikolaou, P.; Goodson, B. M.; Chekmenev, E. Y. NMR Hyperpolarization Techniques for Biomedicine. Chem.—Eur. J. 2015, 21, 3156-3166.

Procissi, D.; Claus, F.; Burgman, P.; Koziorowski, J.; Chapman, J. D.; Thakur, S. B.; Matei, C.; Ling, C. C.; Koutcher, J. A. In Vivo 19F Magnetic Resonance Spectroscopy and Chemical Shift Imaging of Tri-Fluoro-Nitroimidazole as a Potential Hypoxia Reporter in Solid Tumors. Clin. Cancer Res. 2007, 13, 3738-3747.

Rayner, P. J.; Duckett, S. Signal Amplification by Reversible Exchange (SABRE): From Discovery to Diagnosis. Angew. Chem., Int. Ed. 2018, 6742-6753.

Reineri, F.; Viale, A.; Ellena, S.; Boi, T.; Daniele, V.; Gobetto, R.; Aime, S. Use of Labile Precursors for the Generation of Hyperpolarized Molecules from Hydrogenation with Parahydrogen and Aqueous-Phase Extraction. Angew. Chem., Int. Ed. 2011, 50, 7350-7353.

F. Reineri, T. Boi, S. Aime. ParaHydrogen Induced Polarization of 13C carboxylate resonance in acetate and pyruvate. Nat. Commun., 2015, 6, 5858.

Shchepin, R. V.; Truong, M. L.; Theis, T.; Coffey, A. M.; Shi, F.; Waddell, K. W.; Warren, W. S.; Goodson, B. M.; Chekmenev, E. Y. Hyperpolarization of "Neat" Liquids by NMR Signal Amplification by Reversible Exchange. J. Phys. Chem. Lett. 2015, 6, 1961-1967.

R. V. Shchepin, D. A. Barskiy, A. M. Coffey, T. Theis, F. Shi, W. S. Warren, B. M. Goodson, E. Y. Chekmenev. 15N Hyperpolarization of Imidazole-15N2 for Magnetic Resonance pH Sensing Via SABRE-SHEATH. ACS Sensors, 2016, 1 (6), 640-644.

R. V. Shchepin, D. A. Barskiy, A. M. Coffey, I. V. Manzanera Esteve, E. Y. Chekmenev. Efficient Synthesis of Molecular Precursors for Para-Hydrogen-Induced Polarization of Ethyl Acetate-1-(13) C and Beyond. Angew. Chem. Int. Ed., 2016, 55 (20), 6071-6074.

Shchepin, R. V.; Goodson, B. M.; Theis, T.; Warren, W. S.; Chekmenev, E. Y. Toward Hyperpolarized 19F Molecular Imaging via Reversible Exchange with Parahydrogen. ChemPhysChem 2017, 18, 1961-1965.

Shchepin, R. V.; Jaigirdar, L.; Theis, T.; Warren, W.; Goodson, B.; Chekmenev, E. Spin Relays Enable Efficient Long-Range Heteronuclear Signal Amplification by Reversible Exchange. J. Phys. Chem. C 2017, 121, 28425-28434.

Shchepin, R. V.; Jaigirdar, L.; Chekmenev, E. Y. Spin-Lattice Relaxation of Hyperpolarized Metronidazole in Signal Amplification by Reversible Exchange in Micro-Tesla Fields. J. Phys. Chem. C 2018, 122, 4984-4996.

Shi, F.; Coffey, A. M.; Waddell, K. W.; Chekmenev, E. Y.; Goodson, B. M. Heterogeneous Solution NMR Signal Amplification by Reversible Exchange. Angew. Chem., Int. Ed. 2014, 53, 7495-7498.

Shi, F.; Coffey, A. M.; Waddell, K. W.; Chekmenev, E. Y.; Goodson, B. M. Nanoscale Catalysts for NMR Signal Enhancement by Reversible Exchange. J. Phys. Chem. C 2015, 119, 7525-7533.

Shi, F.; He, P.; Best, Q. A.; Groome, K.; Truong, M. L.; Coffey, A. M.; Zimay, G.; Shchepin, R. V.; Waddell, K. W.; Chekmenev, E. Y.; et al., Aqueous NMR Signal Enhancement by Reversible Exchange in a Single Step Using Water-Soluble Catalysts. J. Phys. Chem. C 2016, 120, 12149-12156.

Theis, T.; Truong, M. L.; Coffey, A. M.; Shchepin, R. V.; Waddell, K. W.; Shi, F.; Goodson, B. M.; Warren, W. S.; Chekmenev, E. Y. Microtesla SABRE Enables 10% Nitrogen-15 Nuclear Spin Polarization. J. Am. Chem. Soc. 2015, 137, 1404-1407.

Theis, T.; Ortiz, G. X.; Logan, A. W. J.; Claytor, K. E.; Feng, Y.; Huhn, W. P.; Blum, V.; Malcolmson, S. J.; Chekmenev, E. Y.; Wang, Q.; Warren, W. S. Direct and Cost-Efficient Hyperpolarization of Long-Lived Nuclear Spin States on Universal 15N2-Diazirine Molecular Tags. Sci. Adv. 2016, 2, e1501438.

Truong, M. L.; Shi, F.; He, P.; Yuan, B.; Plunkett, K. N.; Coffey, A. M.; Shchepin, R. V.; Barskiy, D. A.; Kovtunov, K. V.; Koptyug, I. V. Irreversible Catalyst Activation Enables Hyperpolarization and Water Solubility for NMR Signal Amplification by Reversible Exchange. J. Phys. Chem. B 2014, 118, 13882-13889.

Truong, M. L.; Theis, T.; Coffey, A. M.; Shchepin, R. V.; Waddell, K. W.; Shi, F.; Goodson, B. M.; Warren, W. S.; Chekmenev, E. Y. 15N Hyperpolarization By Reversible Exchange Using SABRE-SHEATH. J. Phys. Chem. C 2015, 119, 8786-8797.

U.S. EPA. 1994. "Method 200.8: Determination of Trace Elements in Waters and Wastes by Inductively Coupled Plasma-Mass Spectrometry," Revision 5.4. Cincinnati, Ohio Vazquez-Serrano, L. D.; Owens, B. T.; Buriak, J. M. The Search for New Hydrogenation Catalyst Motifs Based on N-Heterocyclic Carbene Ligands. Inorg. Chim. Acta 2006, 359, 2786-2797.

Walker, T. G.; Happer, W. Spin-Exchange Optical Pumping of Noble-Gas Nuclei. Rev. Mod. Phys. 1997, 69, 629-642.

Weissleder, R. Molecular Imaging in Cancer. Science 2006, 312, 1168-1171.

Zhivonitko, V. V.; Skovpin, I. V.; Koptyug, I. V. Strong 31P nuclear spin hyperpolarization produced via reversible chemical interaction with parahydrogen. Chem. Commun. 2015, 51, 2506-2509.

Zhao, E.; Zheng, H.; Zhou, R.; Hagelin-Weaver, H.; Bowers, C. Shaped Ceria Nanocrystals Catalyze Efficient and Selective Para-Hydrogen-Enhanced Polarization. Angew. Chem., Int. Ed. 2015, 54, 14270-14275.

R. Zhou, E. Zhao, W. Cheng, L. Neal, H. Zheng, R. Quinones, H. Hagelin-Weaver, C. Bowers. Parahydrogen-induced polarization by pairwise replacement catalysis on Pt and Ir nanoparticles. J. Am. Chem. Soc., 2015, 137 (5), 1938-1946.

What is claimed is:

1. A method of removing a homogeneous catalyst from a solution comprising the homogeneous catalyst and a hyperpolarized agent, the method comprising:
    contacting the solution comprising the homogeneous catalyst and the hyperpolarized agent with a catalyst removal agent, wherein the catalyst removal agent comprises a sulfur, nitrogen, or oxygen atom, and wherein the sulfur, nitrogen, or oxygen atom of the catalyst removal agent bonds with the homogeneous catalyst.

2. The method of claim 1 further comprising removing the catalyst removal agent bonded to the homogeneous catalyst from the solution thereby providing a purified solution comprising the hyperpolarized agent, wherein the purified solution is substantially free of the homogeneous catalyst.

3. The method of claim 1 wherein the catalyst removal agent is an organic species.

4. The method of claim 1 wherein the sulfur, nitrogen, or oxygen atom of the catalyst removal agent contains at least one free binding site.

5. The method of claim 1 wherein the catalyst removal agent is functionalized on a solid-phase particle.

6. The method of claim 5 wherein the solid-phase particle comprises $SiO_2$ or polystyrene.

7. The method of claim 6 wherein the solid-phase particle comprises $SiO_2$.

8. The method of claim 7 wherein the solid-phase particle comprises a bead comprising $SiO_2$.

9. The method of claim 6 wherein the catalyst removal agent comprises at least one of:

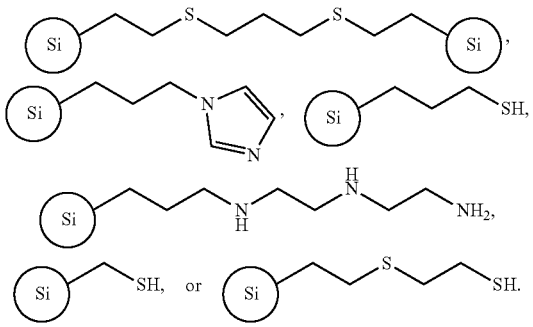

10. The method of claim 1 wherein the contacting step comprises adding the catalyst removal agent to the solution.

11. The method of claim 1 wherein the contacting step comprises passing the solution through a separation apparatus containing the catalyst removal agent.

12. The method of claim 2 wherein the hyperpolarized agent maintains a hyperpolarized state in the purified solution.

13. The method of claim 1 wherein the homogeneous catalyst is a SABRE catalyst or a PHIP catalyst.

14. The method of claim 1 further comprising subjecting a solution comprising the homogeneous catalyst and a hyperpolarization agent to SABRE or PHIP to obtain the solution comprising the homogeneous catalyst and the hyperpolarized agent.

15. The method of claim 2 further comprising recovering the homogeneous catalyst from the catalyst removal agent.

16. The method of claim 15 wherein the recovering step comprises applying a catalyst release agent to the catalyst removal agent, wherein the catalyst release agent reacts with the catalyst removal agent to break the bond between the catalyst removal agent and the homogeneous catalyst.

17. The method of claim 15 wherein the recovering step comprises applying energy to the catalyst removal agent, wherein the energy breaks the bond between the catalyst removal agent and the homogeneous catalyst.

18. The method of claim 17 wherein the applying energy step comprises applying at least one of heat, light, or electricity to the catalyst removal agent.

19. A method of removing a homogeneous catalyst from a solution comprising the homogeneous catalyst and a hyperpolarized agent, the method comprising:
  subjecting a solution comprising the homogeneous catalyst and a hyperpolarization agent to SABRE or PHIP to obtain the solution comprising the homogeneous catalyst and the hyperpolarized agent;
  contacting the solution comprising the homogeneous catalyst and the hyperpolarized agent with a catalyst removal agent, wherein the catalyst removal agent comprises a sulfur, nitrogen, or oxygen atom, wherein the sulfur, nitrogen, or oxygen atom of the catalyst removal agent bonds with the homogeneous catalyst; and
  removing the catalyst removal agent bonded to the homogeneous catalyst from the solution thereby providing a purified solution comprising the hyperpolarized agent, wherein the purified solution is substantially free of the homogeneous catalyst.

20. A method of recovering a homogeneous catalyst from a solution comprising the homogeneous catalyst and a hyperpolarized agent, the method comprising:
  contacting the solution comprising the homogeneous catalyst and the hyperpolarized agent with a catalyst removal agent, wherein the catalyst removal agent bonds with the homogeneous catalyst;
  removing the catalyst removal agent bonded to the homogeneous catalyst from the solution thereby providing a purified solution comprising the hyperpolarized agent, wherein the purified solution is substantially free of the homogeneous catalyst; and
  recovering the homogeneous catalyst from the catalyst removal agent by performing at least one of:
    (1) applying a catalyst release agent to the catalyst removal agent, wherein the catalyst release agent reacts with the catalyst removal agent to break the bond between the catalyst removal agent and the homogeneous catalyst; or
    (2) applying energy to the catalyst removal agent, wherein the energy breaks the bond between the catalyst removal agent and the homogeneous catalyst.

* * * * *